(12) United States Patent
Parry et al.

(10) Patent No.: US 12,457,123 B2
(45) Date of Patent: Oct. 28, 2025

(54) SECURE KEY AND TRANSACTION MANAGEMENT FOR MULTI-PARTY COMPUTATION SYSTEMS

(71) Applicant: MPC Holding, Inc., New York, NY (US)

(72) Inventors: Miles Robert Parry, Croydon (GB); Cat-Tuong Le-Huy, London (GB); Olaf Stelling, Florence (IT)

(73) Assignee: MPC Holding, Inc., Concord, NH (US)

( * ) Notice: Subject to any disclaimer, the term of this patent is extended or adjusted under 35 U.S.C. 154(b) by 50 days.

(21) Appl. No.: 18/594,191

(22) Filed: Mar. 4, 2024

(65) Prior Publication Data
US 2024/0296445 A1    Sep. 5, 2024

Related U.S. Application Data

(60) Provisional application No. 63/509,017, filed on Jun. 19, 2023, provisional application No. 63/449,876, filed on Mar. 3, 2023.

(51) Int. Cl.
*H04L 9/00*      (2022.01)
*G06Q 20/06*     (2012.01)
(Continued)

(52) U.S. Cl.
CPC ........... *H04L 9/50* (2022.05); *G06Q 20/3674* (2013.01); *G06Q 20/3825* (2013.01); *G06Q 20/3829* (2013.01); *H04L 9/3247* (2013.01)

(58) Field of Classification Search
CPC ..... H04L 9/50; H04L 9/3247; G06Q 20/3674; G06Q 20/3825; G06Q 20/3829; G06Q 20/065; G06Q 20/36; G06Q 20/405
(Continued)

(56) References Cited

U.S. PATENT DOCUMENTS 10,211,977 B1    2/2019   Roth et al.
11,418,329 B1    8/2022   Miller
(Continued)

OTHER PUBLICATIONS

Jaroucheh et al. "Secretation: Toward a Decentralised Identity and Verifiable Credentials Based Scalable and Decentralised Secret Management Solution", 2021 IEEE International Conference on Blockchain and Cryptocurrency, modified on Aug. 24, 2022, 6 pages (Year: 2022).*

(Continued)

*Primary Examiner* — James D Nigh
(74) *Attorney, Agent, or Firm* — Barnes & Thornburg LLP

(57) ABSTRACT

The disclosed technology provides for managing, authenticating, and authorizing transactions utilizing multi-party-computation ("MPC") across a network. A method includes receiving, by a server, policy data defining a transaction signing policy, receiving, from an initiator node, a transaction request, in response to receiving the transaction request: (i) determining, based on the transaction signing policy, a threshold number of virtual nodes in a cloud environment that are included in a transaction signing group and that are required to authorize the transaction request, and (ii) sending, to each of the virtual nodes, an authorization request to authorize the transaction request, receiving, from at least a subset of the virtual nodes, authorization data indicating that the transaction request has been authorized, and returning, to a hardware security module (HSM), a transaction payload based on processing the authorization data.

20 Claims, 11 Drawing Sheets

(51) Int. Cl.
  *G06Q 20/36*    (2012.01)
  *G06Q 20/38*    (2012.01)
  *G06Q 20/40*    (2012.01)
  *H04L 9/32*     (2006.01)

(58) Field of Classification Search
  USPC .......................................................... 705/75
  See application file for complete search history.

(56) References Cited

U.S. PATENT DOCUMENTS

| | | |
|---|---|---|
| 2017/0222802 A1 | 8/2017 | Rubin et al. |
| 2018/0167203 A1 | 6/2018 | Belenko |
| 2018/0205711 A1 | 7/2018 | Kumar et al. |
| 2018/0295115 A1 | 10/2018 | Kumar et al. |
| 2019/0044929 A1 | 2/2019 | Kashyap et al. |
| 2019/0158474 A1 | 5/2019 | Kashyap et al. |
| 2020/0028842 A1 | 1/2020 | Leiserson et al. |
| 2020/0044863 A1 | 2/2020 | Yadlin et al. |
| 2020/0204357 A1 | 6/2020 | Seyfried et al. |
| 2020/0204530 A1 | 6/2020 | Kumar et al. |
| 2021/0111886 A1 | 4/2021 | Leiserson |
| 2021/0240857 A1 | 8/2021 | Bandi et al. |
| 2021/0273921 A1 | 9/2021 | Kumar et al. |
| 2022/0014456 A1 | 1/2022 | Bandi et al. |
| 2022/0247576 A1 | 8/2022 | Beekman et al. |
| 2022/0277107 A1 | 9/2022 | Beekman et al. |
| 2022/0318907 A1* | 10/2022 | Bleznak ............... G06Q 20/065 |
| 2023/0155989 A1 | 5/2023 | Kumar et al. |
| 2023/0421396 A1* | 12/2023 | Ocegueda ................. H04L 9/50 |
| 2023/0421397 A1* | 12/2023 | Ocegueda ............. H04L 9/0825 |
| 2023/0421540 A1* | 12/2023 | Ocegueda ............... G06F 9/547 |
| 2024/0015023 A1* | 1/2024 | Stock .................... H04L 9/3236 |
| 2024/0015034 A1* | 1/2024 | Stock .................... H04L 9/3247 |
| 2024/0015035 A1* | 1/2024 | Stock .................... H04L 9/0894 |
| 2024/0070659 A1* | 2/2024 | Boo ....................... G06Q 40/04 |

OTHER PUBLICATIONS

Cordial Systems Website, accessed at https://web.archive.org/web/20240301034235/https://cordialsystems.com/ (Way Back Machine Internet Archive) on May 17, 2024, snapshot dated Mar. 1, 2024, 8 pages.
International Search Report and Written Opinion in PCT/US2024/018295 dated Jun. 10, 2024, 12 pages.

\* cited by examiner

SECURE KEY AND TRANSACTION MANAGEMENT FOR MULTI-PARTY COMPUTATION SYSTEMS

INCORPORATION BY REFERENCE

This application claims the benefit of priority of U.S. Provisional Patent Application No. 63/509,017, filed Jun. 19, 2023, and U.S. Provisional Patent Application No. 63/449,876, filed Mar. 3, 2023, each of which is incorporated herein by reference in its entirety.

TECHNICAL FIELD

This document generally describes devices, systems, architectures, and methods related to multi-party computation ("MPC") technology that allows multiple parties to jointly and securely initiate and administer transactions on blockchain networks.

BACKGROUND

Multi-party computation techniques can include cryptographic protocol for distributing a computation across multiple parties where no individual party may see other parties' data. MPC techniques can be used for performing secure transactions, such as cryptocurrency transactions, over networks, such as blockchains. A blockchain is a digitally distributed, decentralized, public ledger that can facility processes of recording transactions and tracking assets, tokens, and other transactional data across a network.

To transact over networks, such as blockchains, parties can establish wallets. A wallet, such as an MPC wallet, is a type of blockchain wallet (e.g., crypto wallet) that requires more than one party to authorize transactions with assets to and from the wallet. The process of generating wallet keys and creating digital signatures can therefore be executed by different parties running a distributing computing protocol. A wallet typically consists of a public key (or address) and a private key. MPC techniques can be used to secure and authorize transactions involving the wallet, such as by requiring a threshold quantity of users to authorize a transaction.

SUMMARY

This document generally describes devices, systems, architectures, and methods related to MPC cryptographic technology that allows multiple parties to better and more securely manage MPC transactions for blockchain assets in a manner that permits for greater granularity and control over the specific multi-party authorizations that are required for various transactions. For example, MPC technology can rely on the joint and distributed computation of a function by multiple parties while keeping the inputs of those parties private, such as private keys, thereby allowing the multiple parties to send and receive blockchain assets between wallets and secure other types of assets, transactional data, and/or data over blockchain networks. The disclosed technology provides an improved MPC architecture and process flow that permits for greater security and control over MPC transactions with various hardware security modules ("HSM") to provide policies that attach to blockchain wallets or other data and that dictate the security conditions that are required for various transactions to be processed and authorized with regard to the wallets according to user defined-parameters. Whereas MPC technology has been more challenging to administer, manage, and control, which could expose potential security vulnerabilities, the disclosed technology provides for more secure and granular control over MPC transactions, which can improve the overall security of blockchain transactions and MPC-based blockchain assets.

For example, this document generally describes technology for non-custodial blockchain key management that can allow parties to securely compute and generate (without storing) their private keys as well as securely sending and receiving various blockchain assets, such as cryptocurrencies that are represented by blockchain tokens, with multiple fail-safe protections built-in according to one or more user-defined parameters. The disclosed technology can be offered as software as a service (SaaS) or can be deployed at client computing devices (e.g., computers, laptops, mobile devices, smartphones, mobile phones, tablets, etc. of users or other parties). More particularly, the disclosed technology can utilize MPC techniques, which are cryptographic techniques that allow multiple parties to jointly and securely compute a function while keeping their inputs private and not shared amongst a group, unlike multisignature (multi-sig) technologies in which parts of a key are brought back together into one location to form a full key. MPC techniques can leverage the ability to split off piece of data into multiple encoded parts, or primitives, known as secret shares. On their own, the shares may reveal nothing about the original data, but if n of m parties (e.g., 2 or more, 3 of 5, or any other defined signing threshold) perform the same operation on a set of secret shares then create a computational equivalent of the secret shares, it is as if that operation was performed on the original data to generate a result.

Accordingly, the disclosed technology provides a secure key management system that allows parties to compute (and generate without storing) private keys that are used to sign interactions involving blockchain assets (e.g., cryptocurrencies, other blockchain assets such as crypto private keys) and initiate digital asset transactions and communicate those transactions to applicable blockchain(s), solely directed by the parties. The disclosed technology may also leverage any quantity of hardware security modules (HSMs), which can be provided by one or more server systems or other third party server systems. The disclosed technology can provide software that runs on the HSMs to perform the disclosed techniques.

One or more embodiments described herein can include a method for managing and authorizing multi-party-computation ("MPC") transactions across a network, the method including: receiving, by a server and from a primary client device, policy data that defines a transaction signing policy, the policy data including (i) a designation of a transaction signing group, (ii) a designation of a group of transaction signing client devices that are included in the transaction signing group, and (iii) for each transaction class of a group of transaction classes, a corresponding threshold number of the group of transaction signing client devices that is required to authorize a transaction request, the transaction request being a member of the transaction class, receiving, by the server and from a transaction initiator device, the transaction request, the transaction request including a transaction parameter that indicates a transaction class of the transaction that is a member of the group of transaction classes, in response to receiving the transaction request: (i) determining, by the server and based on the transaction parameter and the transaction signing policy, a threshold number of transaction signing client devices amongst the group of transaction signing client devices that are included in the transaction signing group that are required to authorize the transaction request, and (ii) sending, by the server and to each of the group of transaction signing client devices that are included in the transaction signing group, an authorization request for each of the group of transaction signing client devices that are included in the transaction signing group to authorize the transaction request, receiving, by the server and from at least a subset of the group of transaction signing client devices that are included in the transaction signing group, authorization data indicating that the transaction request has been authorized by the respective transaction signing client device, and based on a determination that the authorization data is collected from a number of the group of transaction signing client devices that are included in the transaction signing group that satisfies the threshold number of transaction signing client devices required to authorize the transaction request, returning, by the server and to a hardware security module (HSM), a transaction payload.

In some implementations, the embodiments described herein can optionally include one or more of the following features. For example, the transaction initiator device and the primary client device can be a same computing device. The group of transaction signing client devices may not include the transaction initiator device. The transaction class can indicate a user-defined range of transaction amounts, and the transaction parameter can be a user-defined transaction amount. The transaction class can indicate a user-defined type of transaction asset, and the transaction parameter can be a user-defined transaction asset type. The method can also include sending, by the server and to each of the group of transaction signing client devices, data for presenting, in respective graphical user interface (GUI) displays, a notification indicating that the transaction signing client device is included in the transaction signing group, and receiving, by the server and from each of the group of transaction signing client devices, data indicating that the transaction signing client device accepted inclusion in the transaction signing group.

In some implementations, the HSM can be configured to execute software that is provided by the server, where executing the software can cause the HSM to: compute a cryptographic private access key that is associated with a digital wallet for the transaction request in response to the server determining that the authorization data is collected from the number of the plurality of transaction signing client devices that are included in the transaction signing group, where the determination made by the server can indicate that secret material associated with the digital wallet can be used by the HSM to compute the cryptographic private access key. The digital wallet can have a relationship with the primary client device. The cryptographic private access key may not be stored by the HSM. Executing the software further can cause the HSM to digitally sign the transaction request. Executing the software further can cause the HSM to broadcast the signed transaction request across the network via one or more third-party nodes. The one or more third-party nodes can be selected by the primary client device or the transaction initiator device.

In some implementations, the transaction request can authorize a transaction, wherein the transaction request can include a request to transfer a cryptocurrency asset between a digital wallet assigned to the primary client device and a wallet assigned to a recipient client device. The network can be a blockchain. Sometimes, the group of transaction signing client devices may not include the primary client device.

As another example, before returning, by the server and to a hardware security module (HSM), a transaction payload, the method can include performing, by the server, a multi-layer authentication check. The multi-layer authentication check can include at least one, two, and three layers. The multi-layer authentication check can include at least one of: a digital identity check, a policy signing check, a hardware identification check, a per transaction check, a code execution check, or an infrastructure check. The transaction payload can be returned in response to determining, by the server, that each check of the multi-layer authentication check passes. The method can also include denying, by the server, execution of the transaction based on a determination that one check of the multi-layer authentication check does not pass.

Sometimes, performing, by the server, the digital identity check can include verifying, for each of the group of transaction signing client devices in the transaction signing group, (i) a share of a cryptographic key provided by the device and (ii) an identifier of the device, wherein (i) and (ii) are received in the authorization data. Performing, by the server, the policy signing check can include verifying the policy data. Performing, by the server, the hardware identification check can include performing remote attestation to check whether an execution environment of the HSM is secure. Performing, by the server, the per transaction check can include encrypting the transaction payload, where encrypting the transaction payload can prevent the server from accessing corresponding transaction data. Performing, by the server, the code execution check can include creating a secure enclave for executing code for the transaction. Performing, by the server, the infrastructure check can include validating the HSM and validating code execution operations for the transaction to be performed at the HSM.

One or more embodiments described herein can include a system for managing and authorizing multi-party-computation (MPC) transactions across a network, the system including: a primary client device that can be configured to: generate a signing policy including (i) a designation of a transaction signing group, (ii) a designation of a group of transaction signing client devices that are included in the transaction signing group, and (iii) for each transaction class of a group of transaction classes, a corresponding threshold number of the group of transaction signing client devices that can be required to authorize a transaction request, the transaction request being a member of the transaction class, and initiate a transaction request that includes a transaction parameter indicating a transaction class of the transaction that may be a member of the group of transaction classes. The system can also include a server in wireless network communication with the primary client device, the server being configured to receive, from the primary client device, the signing policy, receive, from the primary client device, the transaction request, determine, based on the transaction parameter and the signing policy, a threshold number of transaction signing client devices amongst the group of transaction signing client devices that are included in the transaction signing group that are required to authorize the transaction request, and send, to each of the group of transaction signing client devices that are included in the transaction signing group, an authorization request for each of the group of transaction signing client devices that are included in the transaction signing group to authorize the transaction request. The system can also include a group of transaction signing client devices in wireless network communication with the server, where each of the group of transaction signing client devices can be configured to:

receive, from the server, the authorization request, authorize the transaction request based on the authorization request, and transmit, to the server, authorization data indicating that the transaction request has been authorized by the respective transaction signing client device. The server can also be configured to: receive, from at least a subset of the group of transaction signing client devices that are included in the transaction signing group, the authorization data, determine the authorization data is collected from a number of the group of transaction signing client devices that are included in the transaction signing group that satisfies the threshold number of transaction signing client devices required to authorize the transaction request, and return a transaction payload for the authorized transaction request.

The system can optionally include one or more of the abovementioned features and/or one or more of the following features. For example, the system can also include a hardware software module (HSM) in wireless network communication with at least the server, and returning the transaction payload for the authorized transaction request can include transmitting, by the server, the transaction payload to the HSM. The HSM can be configured to execute software that is generated and provided by the server, where executing the software causes the HSM to: compute a cryptographic private access key that is associated with a digital wallet for the transaction request, digitally sign the transaction request using the computed cryptographic private access key, and broadcast the signed transaction request across the network via one or more third-party nodes. The server can also include an automated policy engine that can be configured to perform the following steps: determine, based on the transaction parameter and the signing policy, the threshold number of transaction signing client devices amongst the group of transaction signing client devices that are included in the transaction signing group that are required to authorize the transaction request, determine the authorization data is collected from the number of the group of transaction signing client devices that are included in the transaction signing group that satisfies the threshold number of transaction signing client devices required to authorize the transaction request, and return the transaction payload for the authorized transaction request.

One or more embodiments described herein can include a method for managing, authenticating, and authorizing transactions utilizing multi-party-computation ("MPC") across a network, the method including: receiving, by a server and from a primary client device, policy data that defines a transaction signing policy, the policy data including (i) a designation of a transaction signing group, (ii) a designation of a group of virtual nodes in a cloud environment that can be included in the transaction signing group, and (iii) for each transaction class of a group of transaction classes, a corresponding threshold number of the group of virtual nodes that can be required to authorize a transaction request, the transaction request being a member of the transaction class, receiving, by the server and from an initiator node, the transaction request, the transaction request including a transaction parameter that can indicate a transaction class of the transaction that may be a member of the group of transaction classes, in response to receiving the transaction request: (i) determining, by the server and based on the transaction parameter and the transaction signing policy, a threshold number of virtual nodes amongst the group of virtual nodes that are included in the transaction signing group that may be required to authorize the transaction request, and (ii) sending, by the server and to each of the group of virtual nodes that are included in the transaction signing group, an authorization request for each of the group of virtual nodes that are included in the transaction signing group to authorize the transaction request, receiving, by the server and from at least a subset of the group of virtual nodes that are included in the transaction signing group, authorization data indicating that the transaction request has been authorized by the respective virtual node, and based on a determination that the authorization data is collected from a number of the group of virtual nodes that are included in the transaction signing group that satisfies the threshold number of virtual nodes required to authorize the transaction request, returning, by the server and to a hardware security module (HSM), a transaction payload.

The method can optionally include one or more of the abovementioned features and/or one or more of the following features. The initiator node and the primary client device can be a same computing device. The plurality of virtual nodes may not include the initiator node. The method can also include sending, by the server and to each of the group of virtual nodes, data for presenting, in respective graphical user interface (GUI) displays, a notification indicating that the virtual node is included in the transaction signing group, and receiving, by the server and from each of the group of virtual nodes, data indicating that the virtual node accepted inclusion in the transaction signing group. The HSM can be configured to execute software provided by the server, where executing the software may cause the HSM to: compute a cryptographic private access key that can be associated with digital data for the transaction request in response to the server determining that the authorization data is collected from the number of the group of virtual nodes that are included in the transaction signing group, where the determination made by the server can indicate that secret material associated with the digital data can be used by the HSM to compute the cryptographic private access key. The digital data can have a relationship with the primary client device.

Sometimes, executing the software further can cause the HSM to broadcast the signed transaction request across the network via one or more third-party nodes selected by the primary client device or the initiator node. The one or more third-party nodes can be selected by the primary client device or the initiator node. The transaction request can be configured to authorize a transaction. The transaction request can include a request, for the transaction, to transfer a cryptocurrency asset between a digital wallet assigned to the primary client device and a wallet assigned to a recipient client device. The group of virtual nodes may not include the primary client device. Performing, by the server, a multi-layer authentication check can include verifying, for each of the group of virtual nodes in the transaction signing group, (i) a share of a cryptographic key provided by the virtual node and (ii) an identifier associated with the virtual node, where (i) and (ii) can be received in the authorization data. Sometimes, the server can include an automated policy engine that can be configured to perform operations of the method that include: determining, based on the transaction parameter and the signing policy, the threshold number of virtual nodes amongst the group of virtual nodes that are included in the transaction signing group that may be required to authorize the transaction request, determining the authorization data is collected from a number of the group of virtual nodes that are included in the transaction signing group that satisfies the threshold number of virtual nodes required to authorize the transaction request, and returning the transaction payload for the authorized transaction request.

One or more embodiments described herein can include a method for managing transactions across a network, the method including: receiving, by a server executing software to manage transactions over a network, policy data that can define a transaction signing policy, the policy data including (i) a designation of a transaction signing group, (ii) a designation of a group of virtual nodes in a cloud environment that can be included in the transaction signing group, and (iii) a threshold number of the group of virtual nodes that may be required to authorize a transaction request, receiving, by the server and from an initiator node, the transaction request, determining, by a policy engine of the server and based on the transaction signing policy, a threshold number of virtual nodes amongst the group of virtual nodes that are included in the transaction signing group that may be required to authorize the transaction request, sending, by the server and to each of the group of virtual nodes that are included in the transaction signing group, an authorization request for each of the group of virtual nodes that are included in the transaction signing group to authorize the transaction request, receiving, by the server and from at least a subset of the group of virtual nodes that are included in the transaction signing group, authorization data indicating that the transaction request has been authorized by the respective virtual node, determining, by the policy engine of the server, whether the authorization data is collected from a number of the group of virtual nodes that are included in the transaction signing group that satisfies the threshold number of virtual nodes that may be required to authorize the transaction request, and based on a determination that the authorization data is collected from the threshold number of virtual nodes required to authorize the transaction request, returning, by the server and to a hardware security module (HSM), a transaction payload.

The method can optionally include one or more of the abovementioned features and/or one or more of the following features. For example, the HSM can be configured to execute software that may be provided by the server. Executing the software can cause the HSM to compute a cryptographic private access key that may be associated with digital data for the transaction request in response to the server determining that the authorization data is collected from the threshold number of the group of virtual nodes. The determination made by the server can indicate that secret material associated with the digital data can be used by the HSM to compute the cryptographic private access key. Sometimes, the digital data can include a digital wallet.

The devices, system, and techniques described herein may provide one or more of the following advantages. For example, the disclosed technology provides increased security of blockchain assets, such as cryptocurrencies, other digital assets, and other types of blockchain-based information (e.g., non-fungible tokens (NFTs), digital records). After all, a central server system does not maintain control over parties' wallets, decisions, broadcasting to one or more blockchains, and/or the currency or asset itself. Rather, such control remains with the transacting parties themselves. Moreover, the server system may not have access to, or otherwise come into possession or control of a crypto private key for a wallet, and therefore may be unable to retrieve the crypto private key. Instead, the crypto private key may be generated solely at an HSM solely at the direction of the authorized users. The generation of the crypto private key can be conditioned upon confirmation through one or more components of a server system, such as a software HSM, for which only a particular party (e.g., a party initiating a transaction) has the ability to define parameters for key generation. Such a multi-factor security system described herein may also provide that neither the transacting party nor the server system is independently able to complete a transaction in cryptocurrency controlled by the party's wallet. The server system may not initiate, view contents of, and/or stop a transaction by the party. The server system also may not have independent control of the party's blockchain wallet (e.g., cryptocurrency wallet), the signing policies defined by the party, or any given transaction. As described herein, a sufficient number of authentications using signing user credentials defined by the party in the signing policies may be necessary to generate a signed transaction request that will be accepted by an HSM for generation of an actual crypto key-signed blockchain transaction message.

Similarly, the disclosed technology allows for parties to maintain control over role and policy updates in real-time, thereby eliminating operational risk and/or third-party dependencies to perform transactions over various networks. Therefore, the parties can have self-management of workflow policies to control asset movements, which can reduce or eliminate gaps in operating models. The parties can also have self-management of access controls to regulate employee permissions and reduce or eliminate gaps in risk models.

The disclosed technology provides an agile MPC framework, infrastructure, and engine architecture to support various different networks, such as blockchains, and that resolves shortcomings of other MPC frameworks and implementations. For example, the disclosed technology is strong, secure, easy to maintain, and easily extendible. The disclosed technology may experience reduced or no downtime. The disclosed technology can be easily scalable with lightweight infrastructure that can allow for optimized performance in comparison to other MPC frameworks, which may be hampered by monolithic architecture. The disclosed technology provides a multi-point solution for wallets as well as other applications within both cryptocurrency industry and other industries. The disclosed technology also eliminates or otherwise mitigates a need for retail wallets or cumbersome hardware. Similarly, the disclosed technology can remain online and secure, even when new protocols or updates are made to the technology, since updates may simply be made to HSM crypto-libraries. Therefore, MPC algorithms and other techniques employed by the disclosed technology may not be required to be reconfigured from the ground up whenever a new blockchain is added and/or new assets are added. The architecture of the disclosed technology therefore results in short lead times, low engineering costs, and less or no time being offline or otherwise unavailable to parties.

As additional examples, the disclosed technology provides for HSMs to retain secrets relating to a crypto wallet, while the central server system can be used as a threshold authentication and/or authorization layer for transactions of assets over networks. The disclosed technology therefore can decouple crypto wallets from MPC signing curves. The disclosed technology can enable a higher degree of securability of MPC shards. The disclosed technology can allow greater flexibility of deployment of MPC models. Moreover, the disclosed technology can provide for shards to be geographically distributed. The disclosed technology can also enable mixed tenancy deployment models to be used for authenticating and authorizing transactions. Furthermore, the disclosed technology allows for an HSM layer to be replaced with anything that may require an element of control and certainty around authentication and authorization activities, so long as gatekeeper functions are able to appropriately speak to a replacing element (e.g., facilities access, weapons system). As a result, the disclosed technology provides a framework that can be easily adaptable to different services and industries, not just cryptocurrency across blockchain network(s). The HSM can, for example, be replaced with an access control system for security-sensitive sites, where different parts of an enterprise may be required to grant access to a site. The HSM can be replaced with components to allow de-risking of physical operations, such as changing digital vaults secrets by allowing multiple parties to take part in vault setting ceremonies from different locations and without physically risking high value staff. As another example, the HSM can be replaced with components to assist in enabling kill chain executions, such as by integrating multi-permissioning within battle systems and command, control, communications, computers, and/or intelligence (e.g., C41) platforms. As yet another example, the HSM can be replaced with components that can increase throughput and efficiency of gateway processes, such as hiring, procurement, and/or supply chain processes.

In another example, the disclosed technology can be used and extended to any of a variety of blockchain contexts to improve overall security and control related to MPC transactions, such as blockchain transactions related to cryptocurrencies, digital records, and/or other blockchain assets. The disclosed technology can additionally be used outside of a specific blockchain context, and may be more broadly applicable to provision and management of MPC authentications and authorizations related to digital interactions that may require the consent of multiple parties for fulfillment. The disclosed technology may also be used to secure core infrastructure as an additional layer for supervisory control and data acquisition (SCADA) systems. The disclosed technology can be used to secure access to high security assets (e.g., buildings, vaults). The disclosed technology can be implemented as part of an approval business workflow that may require multiple parties to engage at multiple different levels of the business structure. In yet some implementations, the disclosed technology can be used to enable kill chains for various types of battle systems.

The disclosed technology may provide an implementation of multi-permission where a request for permissions can be implemented asynchronously and in parallel to effectively reduce a time to completion while maintaining organizational hierarchy. Traditional process structures may often be linear implementations. A traditional implementation of a request for access to a resource or authorization to undertake a task can often be linear with one request for permission after the other. The disclosed technology, on the other hand, can provide asynchronous and parallelism in permission granting. Rather than waiting for one request after the other, all requests may be processed at a same time, especially knowing that a first party's consent may require consent of one or more other parties/users.

Moreover, the disclosed technology can provide for provisioning role-based access control (RBAC) to particular use cases and security provisioning to secure resources such that an attack surface for various RBAC systems may be reduced (since fewer custom components may require deployment). The disclosed technology can provide security maturation capabilities intended to help protect against common attack vendors. The common attack vendors may include, but are not limited to, logic bombs within the RBAC implementation, insecure configurations of underlying and supporting infrastructure, data security of RBAC data that may be weak and/or unassured, and/or role-based rules governance that can be mutable and subject to inconsistencies from version-to-version. Regarding RBAC logic bombs, every RBAC logic function and request for a given party can be cryptographically signed providing post-event confirmations. The disclosed technology can ensure that a single pattern of implementation is used, thereby reducing an amount of 'invented here' code and reducing dependency on developer quality. Regarding insecure infrastructure, traditional web application server architecture can provide for every layer to be considered separately. The disclosed technology, on the other hand may provide a consistently smaller attack surface. End-to-end cryptographic proofs beginning with a party's x509 certificate can be used along with gatekeeper functions to enhance integrity and veracity of execution flow. Although RBAC data integrity may be unassured in some traditional implementations, the disclosed technology can leverage a combination of x509 certificates and cryptographically-signed state machines to provide a greater certainty of logic execution compared to mutable databases and custom code that may be rolled out for every new application. As both RBAC rulesets and changes to the rulesets may be cryptographically signed, any mutations or changes can be verified throughout a system implementing the disclosed techniques, whereas rules logic may be more difficulty to verify in traditional web applications. Accordingly, since digital applications may require authentication and authorization functionality (e.g., RBAC), the disclosed technology creates a consistent and blueprinted approach to delivering this to an enterprise while lowering a security risk bar.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

Figure 9:
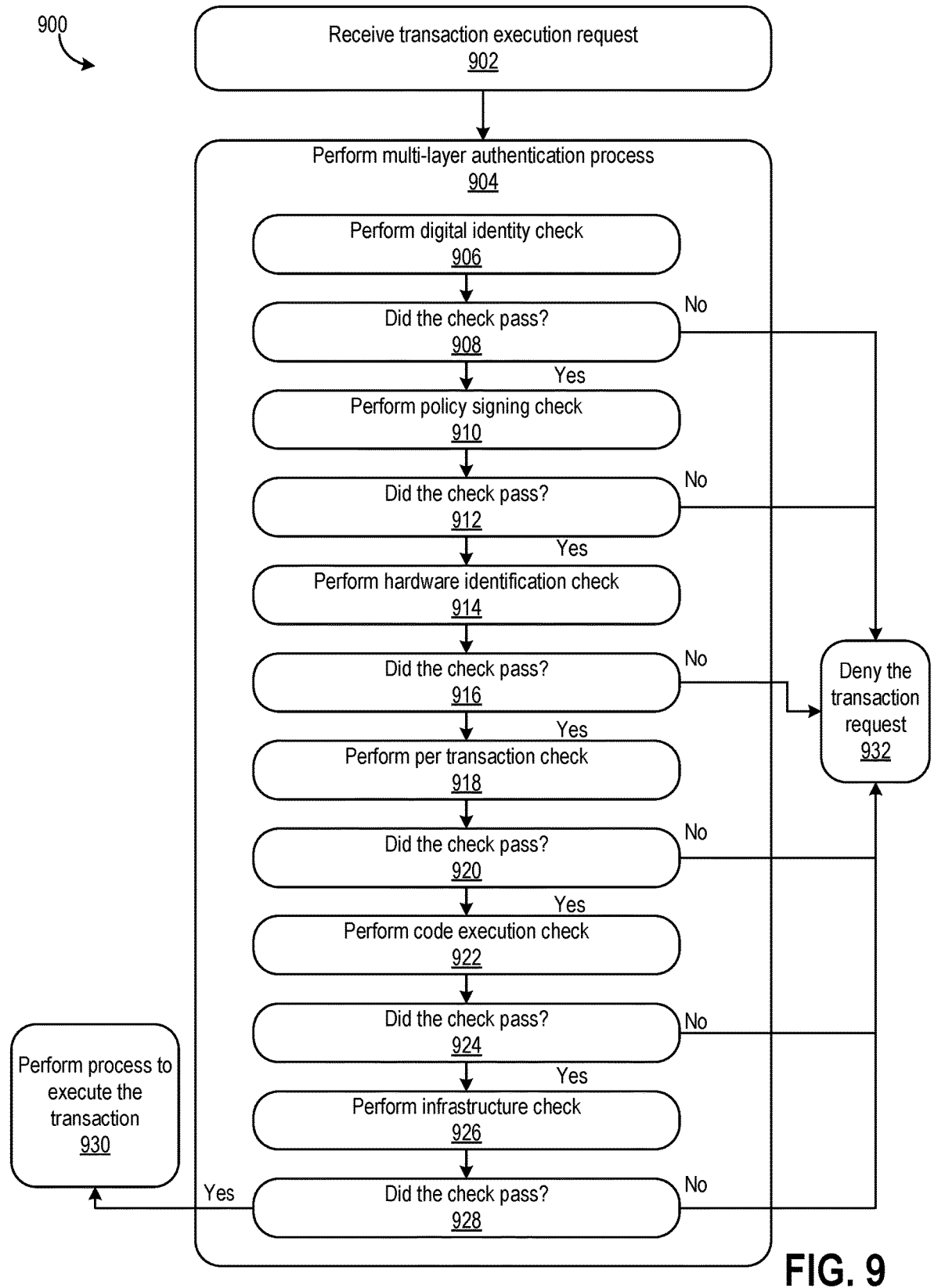
FIG. 9 is a flowchart of a process for performing a multi-layer authentication process to execute a transaction request.

This document generally relates to a modular MPC architecture with one or more authentication layers utilizing multi-data center footprints to distribute blockchain signing across an HSM network. The authentication layers can provide for secure digital identifiers, secure policy signing, secure hardware identifications, secure transactions, secure code execution, and/or secure infrastructure (e.g., using HSMs). As a result, the disclosed technology can provide agile private key management to various different parties transacting across networks, such as blockchains. The disclosed technology can provide a dynamic quantity of layers offering security and protection to digital identity (e.g., by making it clear who is participating in signing a transaction), policy signing (e.g., by allowing for setting conditions and logic before a transaction can be processed), hardware identification (e.g., by using remote attestation to continuously verify that a signing environment is not a fraudulent trusted execution environment, TEE), transactions themselves (e.g., by encrypting each transaction using secure cryptographic extensions, so that the architecture itself may not see contents of any transaction), code execution (e.g., after passing the above-mentioned layers of protection, the MPC architecture can permit for a transaction to execute using a subset of HSMs to randomly perform the signing operations in secure code enclaves), and/or infrastructure (e.g., by ensuring that one or more HSMs, which hold a cryptographic key for the transaction, use a series of secrets and a cryptographic salt to generate material associated with a party that initiated a transaction request). Refer to FIG. 9 for further discussion about such a multi-layer authentication process. The MPC architecture may also be designed to apply to any process that may require an element of control and certainty for authentication and authorization. Moreover, the MPC architecture described herein can remain available and online even when new capabilities are added so that the architecture can continue to be used by relevant parties. Since the disclosed MPC architecture is designed for scale, it advantageously can broker access to applications rather than being deeply embedded into applications.

The disclosed technology may separate authentication and authorization away from a domain subject, such as private keys or other secret material. Specifically, the disclosed technology, rather than being a direct replacement of a private key, can be an adjacent system that brokers access to the private key stored in an HSM environment. This framework can provide for segregating authentication and authorization away from the secrets these layers are intended to protect, and in doing so, this framework can enable a more modular approach of application that allows re-use in various applications and settings/environments (e.g., outside of cryptocurrency).

Secret material can, for example, be split up into n pieces, or shares, to be held by different signing parties across different servers, hardware, devices, jurisdictions, etc. to ensure that no single party has access to such secret material. Thus, the secret material can be secured. When a party desires to execute a transaction, the members of the party can provide a combined set of secrets for purposes of computing a set of credentials to allow an HSM to be instructed to sign the transaction. In combination, the disclosed technology provides a singular process that continues to build on cryptographic evidence (e.g., a signing policy associated with a transaction request and/or a particular transaction-requesting party), execution of a signing policy, and cryptographic signatures of every required signing party to cumulatively output cryptographic authorization for signing the transaction.

The disclosed technology can be used for any type of key that is meant to be kept private, including but not limited to root keys for certificate authorities, private keys for wallets, etc. As merely illustrative examples, the disclosed technology can be used for transactions of various different types of cryptocurrencies and assets, including but not limited to BITCOIN, ETHEREUM, NEAR, USDC, ERC20 tokens, APTOS, COSMOS, ATOM, XRP, AVAX, DOT, and other types of assets or tokens that become available over time.

Figure 1:
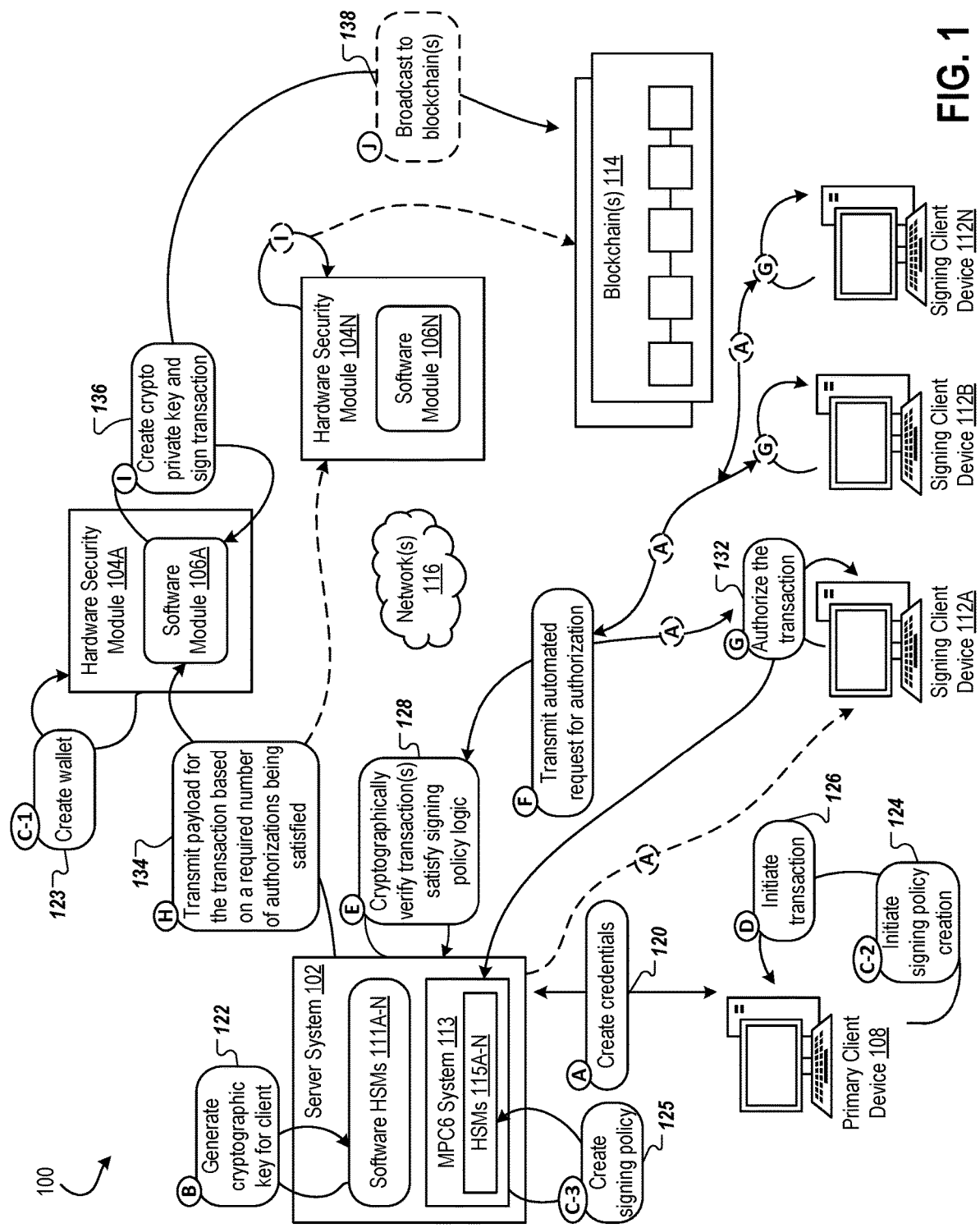
FIG. 1 is a conceptual diagram of a system for providing non-custodial crypto asset management using MPC techniques for parties to securely perform transactions over various networks.

Referring to the figures, FIG. 1 is a conceptual diagram of a system 100 for providing non-custodial crypto asset management using MPC techniques for parties to securely perform transactions over various networks. The system 100 can be used to perform cryptocurrency transactions over various ledgers, including but not limited to blockchains. The system 100 can be used to perform various other types of transactions, including but not limited to smart contract execution, other legal contract execution, etc. Although the system 100 is described in the perspective of cryptocurrency transactions, the system 100 can also be implemented and used in other use cases, including but not limited to healthcare, banking, contracting, legal industry, etc.

Figure 4:
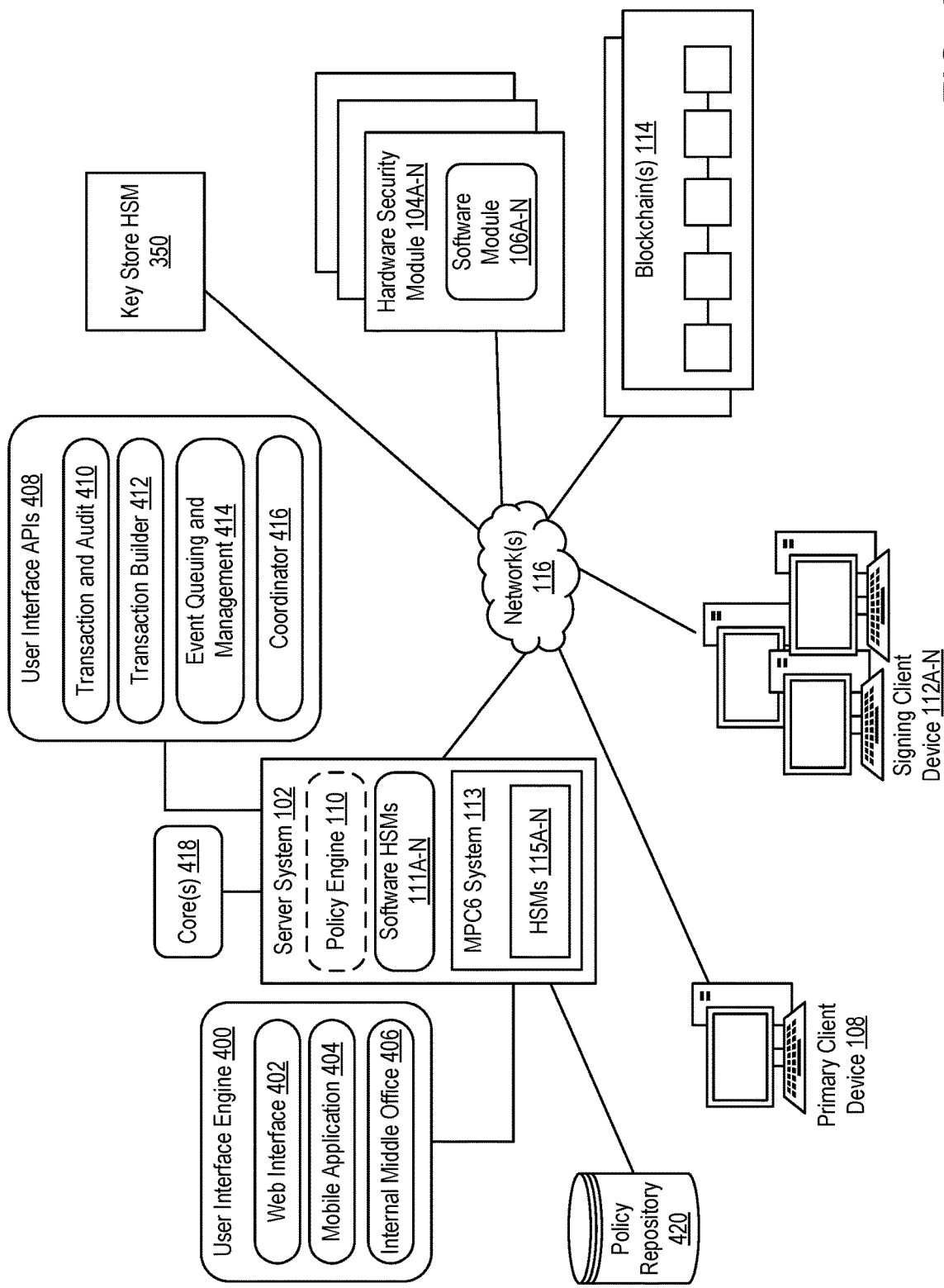
FIG. 4 is a system diagram of components that can perform the disclosed techniques.

In the system 100, a server system 102, hardware security modules (HSMs) 104A-N, primary client device 108, and signing client devices 112A-N, and blockchain(s) 114 can communicate with each other (e.g., wired, wirelessly) via network(s) 116. The server system 102 can be any type of computing system, network of computing devices/systems, cloud-based computing system, secure enclave, etc. that can be configured to provide software to components such as the HSMs 104A-N, the primary client device 108, and the signing client devices 112A-N. The server system 102 can be used to generate and compute MPC-based authentication and authorization requests, which may be presented at a later time to the HSMs 104A-N as proof of authorization for signing and broadcasting to the relevant blockchain(s) 114. Refer to FIG. 4 for further discussion about software and other components that are provided by the server system 102.

In brief, the HSMs 104A-N can each be a physical computing device that safeguards and manages secrets, such as digital keys, performs encryption and decryption functions for digital signatures, and provides authentication and/or other cryptographic functions. HSMs 104A-N can be plug-in cards and/or external devices that attach to computing systems, computing devices, and/or network servers. In some implementations, one or more of the HSMs 104A-N can be operated by and/or configured to the server system 102. One or more of the HSMs 104A-N can be remote from the server system 102 and configured to one or more computing systems, computing devices, network servers, and/or networks of computing devices associated with third parties. For example, a third party can host one or more of the HSMs 104A-N, which then communicate with components in the system 100 such as the server system 102.

Each of the HSMs 104A-N can include respective software modules 106A-N (e.g., multiple different instances of the software module across different HSMs 104A-N), which can be generated and provided to the HSMs 104A-N by the server system 102. The software module 106A-N can provide instructions for the HSMs 104A-N to create crypto private keys and sign transactions that are requested by the primary client device 108, authorized by a required threshold number of the signing client devices 112A-N, and then verified by the server system 102 (such as by one or more of the software modules 106A-N) for satisfying requirements of the signing policy of the primary client device 108.

The primary client device 108 and signing client devices 112A-N can be any types of user computing devices, including but not limited to laptops, tablets, computers, mobile phones, smart phones, wearable devices, cloud-based computing systems, and/or networks of computing systems/servers. In some implementations, the signing client devices 112A-N can include virtual nodes in a cloud environment or other virtual computing environment. Sometimes, the primary client device 108 can also be a virtual node in the cloud environment or other virtual computing environment.

The primary client device 108 and the signing client devices 112A-N can provide the software platform generated by the server system 102 to their relevant users/parties. In some implementations, the services and techniques described herein that are generated by the server system 102 can be hosted by web servers and used by the relevant users/parties over the Internet and/or through webpages. For example, a user can initiate a transaction by accessing and using a website or other web-based service provided by the server system 102 and hosted by the web servers. As another example, a signing party can authorize a transaction by accessing and using the website or other web-based service provided by the server system 102 and hosted by the web servers.

The primary client device 108 can be operated by a party (e.g., user) that creates a wallet (e.g., public wallet) and uses the software platform generated and provided by the server system 102 to perform transactions in the system 100 (e.g., cryptocurrency transactions). The party also can establish signing policies with defined parameters (e.g., a minimum required number of signing client devices that must authorize a transaction before the transaction is verified, signed, then broadcasted) that are then used by the server system 102 to verify transactions that are requested by the primary client device 108.

The signing client devices 112A-N can be operated by other parties (e.g., users) that are selected to be part of one or more signing groups according to the signing policies and parameters defined by the primary client device 108. The signing client devices 112A-N can also run the software platform provided by the server system 102 to allow the associated parties to authorize (or not authorize) transaction requests that are made by the primary client device 108 or other client devices that request transactions across networks such as the blockchain(s) 114.

The blockchain(s) 114 can be any type of system and/or ledger that records transactions, such as cryptocurrency transactions. The blockchain(s) 114 can be public, private, and/or permission-based. The blockchain(s) 114 can allow digital information to be recorded and distributed, but not edited/modified. Thus, the blockchain(s) 114 can be an immutable ledger, or record of transactions that cannot be altered, deleted, or destroyed. The blockchain(s) 114 can be maintained across multiple computing systems that may be linked over one or more networks. The blockchain(s) 114 can include public blockchains (e.g., permissionless distributed ledger on which anyone can join and conduct transactions), private blockchains (e.g., a blockchain network that may operate in a private context, such as a restricted network, or is controlled by a single entity), hybrid blockchains, etc.

Figure 2A:
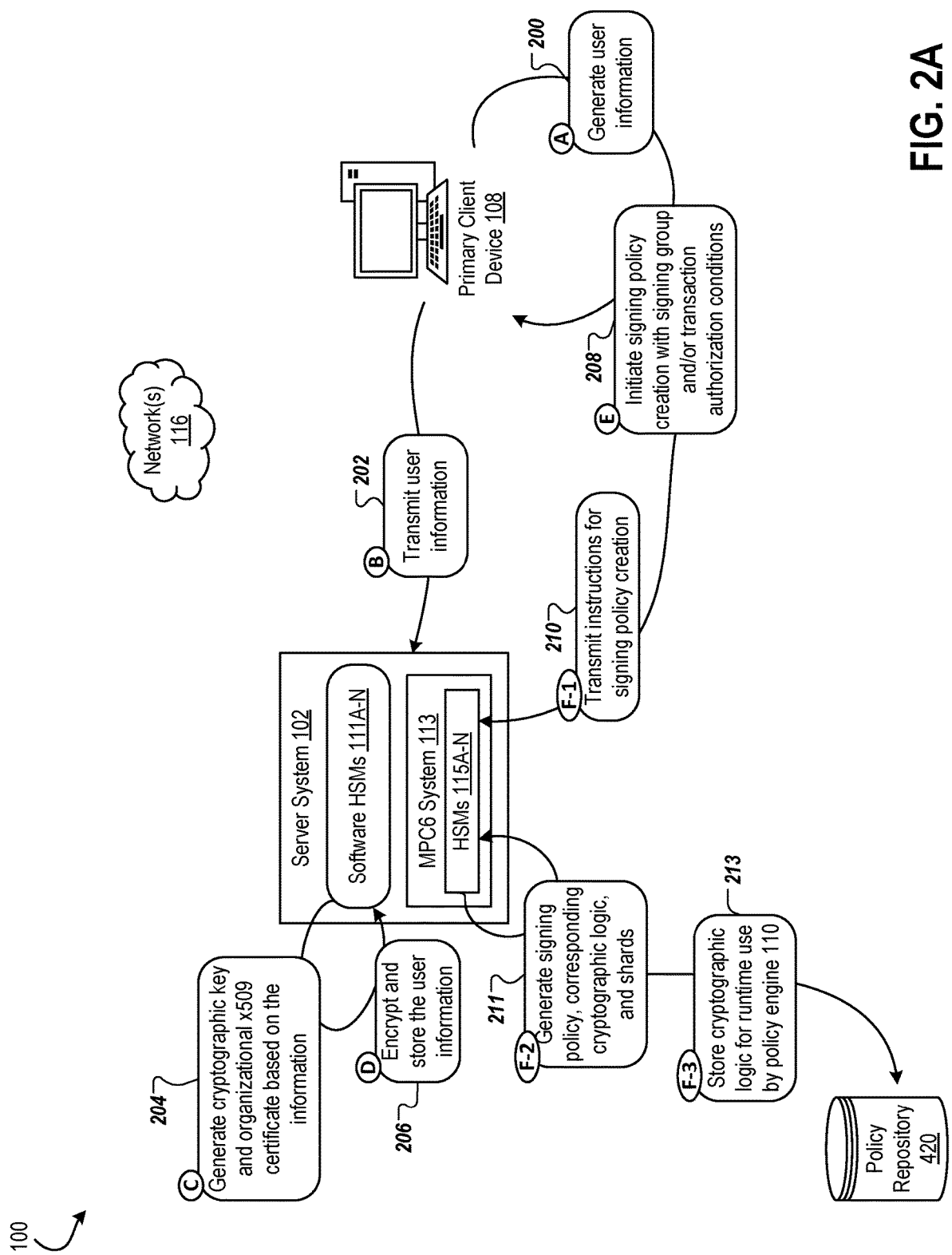
FIG. 2A is a conceptual diagram of a system for generating private keys.

Still referring to the system 100 in FIG. 1, the primary client device 108 and the server system 102 can communicate to create user credentials (as non-limiting examples, these can include username, password, etc.) in block A (120). The server system 102 can also optionally communicate with one or more of the signing client devices 112A-N to create user credentials for parties associated with the devices 112A-N. For example in block A (120), the server system 102 can communicate with the signing client devices 112A-N that do not yet have user credentials established but have been identified as part of a signing group for a signing policy of the primary client device 108. The server system 102 can communicate with the client devices 112A-N before or after one or more other blocks described herein (e.g., after the primary client device 108 creates a signing policy in block C, 124, as part of transmitting an automated request for transaction authorization in block F, 130, before verifying that a transaction satisfies the signing policy in block E, 128, etc.). Refer to FIG. 2A for further discussion.

One or more of the software HSMs 111A-N of the server system 102 can generate a cryptographic key for the primary client based on the user credentials in block B (122). The process to generate the key can be initiated at the primary client device 108 and executed by the one or more software HSMs 111A-N. Refer to FIG. 2A for further discussion.

In block C-1 (123), the HSM 104A can create a wallet for the primary client device 108, based at least in part on the user credentials and public key infrastructure (PKI) certificates.

Figure 2B:
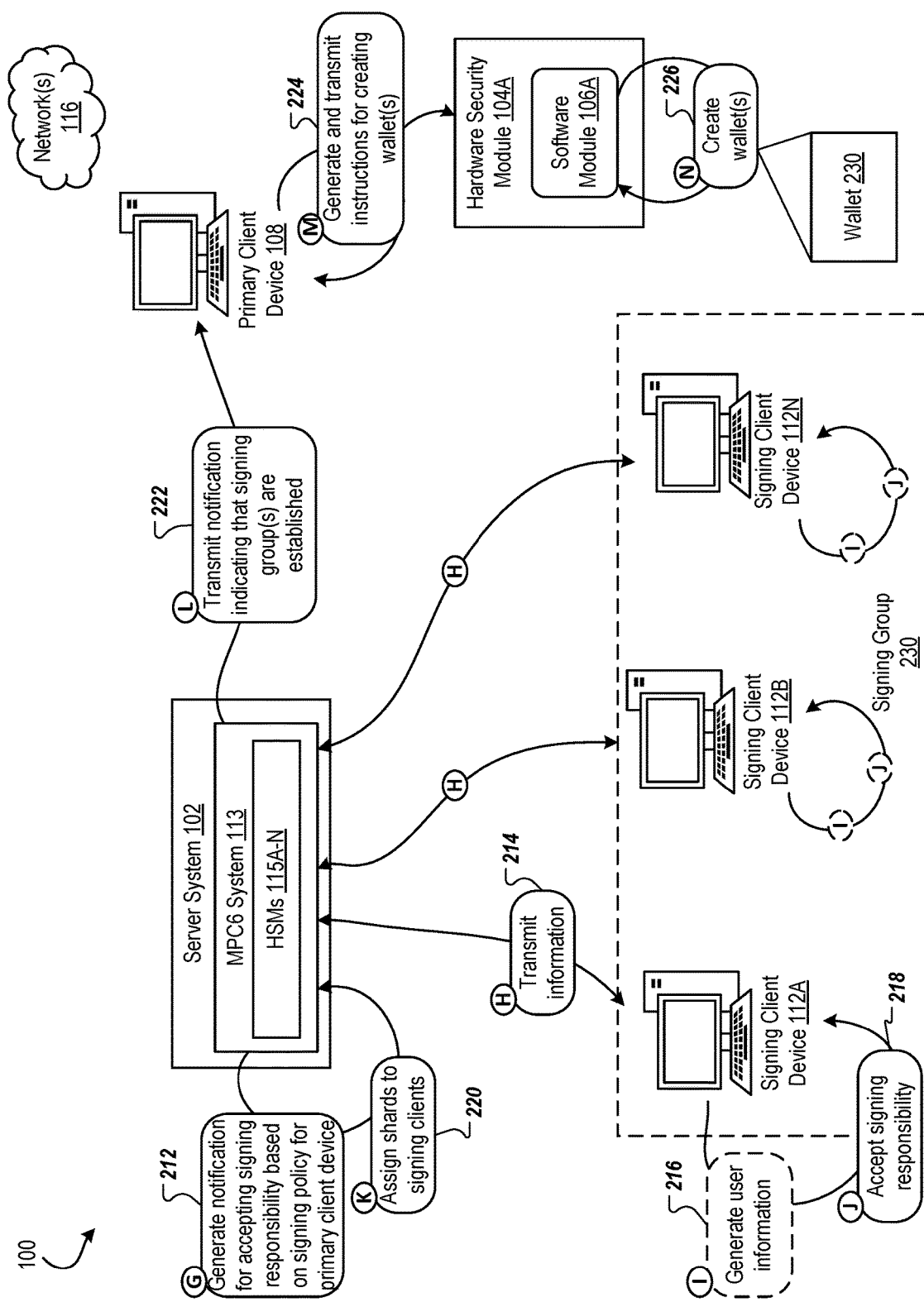
FIG. 2B is a conceptual diagram of a system for establishing signing group(s) to sign transactions according to user-defined signing policies.

In block C-2 (124), the primary client device 108 can initiate creation of a signing policy. Instructions to create/generate the signing policy can be transmitted to the server system 102 (e.g., in plain text format). Accordingly, the HSMs 115A-N of the MPC6 system 113 at the server system 102 can create the signing policy according to parameters defined by the primary client device 108 in block C-2, 124 (block C-3, 125). The signing policy can be created at the server system 102 with multiple different transaction values and/or business logic. Creating the signing policy can, for example, include generating cryptographic logic to then be executed by components of the server system 102, such as the software HSMs 111A-N, during runtime use. Refer to FIGS. 2A-B for further discussion.

Figure 3A:
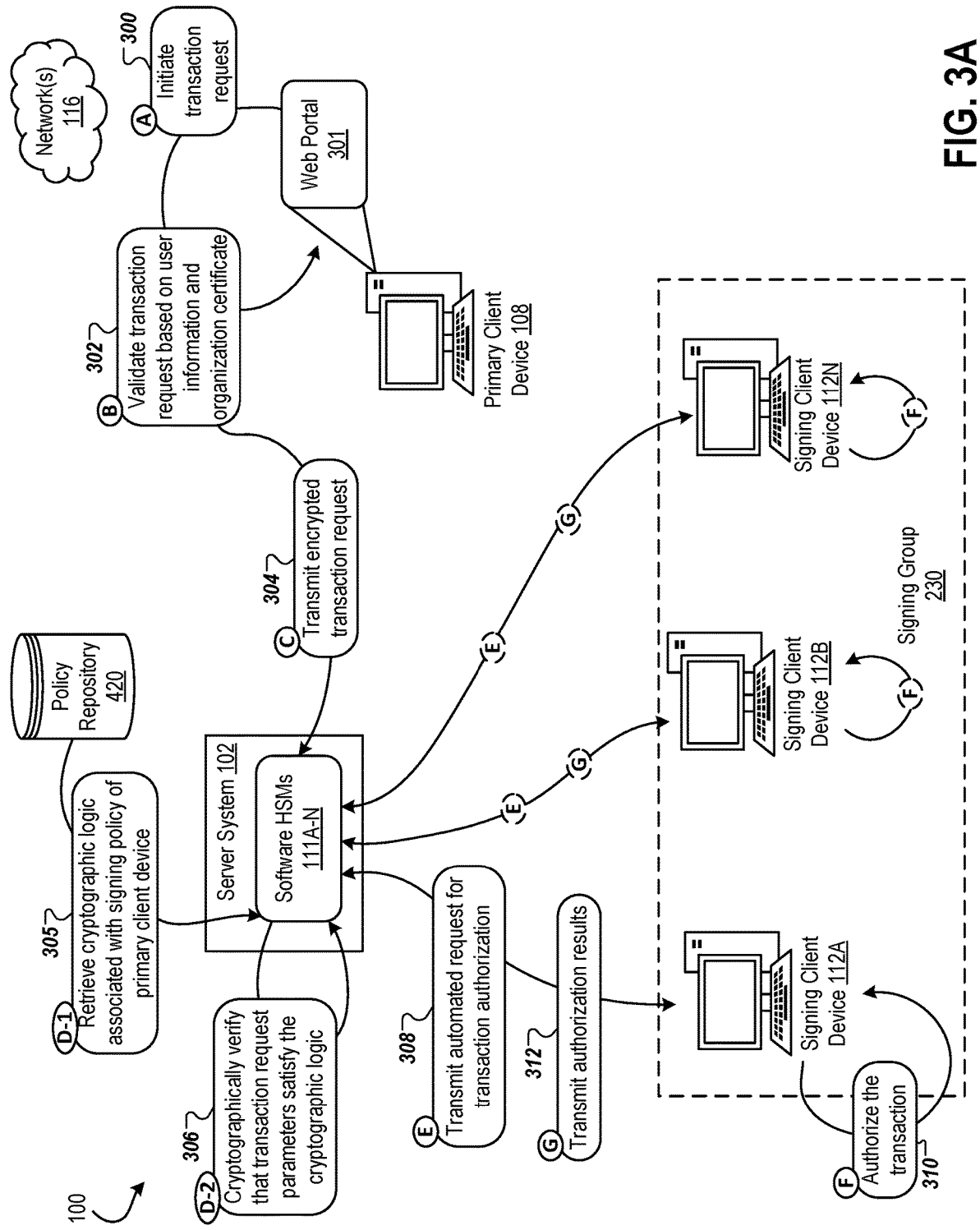
FIG. 3A is a conceptual diagram of a system for initiating transactions and obtaining approval or authorization by signing client devices according to user-defined signing policies.

The primary client device 108 can initiate a transaction request in block D (126). Refer to FIG. 3A for further discussion.

The transaction request can be sent to the server system 102, such as the software HSMs 111A-N, which can cryptographically verify that the transaction request satisfies the signing policy cryptographic logic (block E, 128). Refer to FIG. 3A for further discussion. The server system 102 can also determine, based on transaction details in the transaction request, how many signing client devices are required.

The server system 102 can transmit an automated request for transaction authorization to the determined number of the signing client devices 112A-N needed for authorizing the particular transaction request (block F, 130). In some implementations, the request can be sent to a threshold quantity of the signing client devices 112A-N that is greater than a required number of signing client devices 112A-N to authorize the transaction. The request can be sent to just the required number of signing client devices 112A-N to authorize the transaction, as mentioned above. Refer to FIG. 3A for further discussion. Moreover, in some implementations, the server system 102 can receive the authorization requests and broadcast those requests to the signing client devices 112A-N.

Figure 3B:
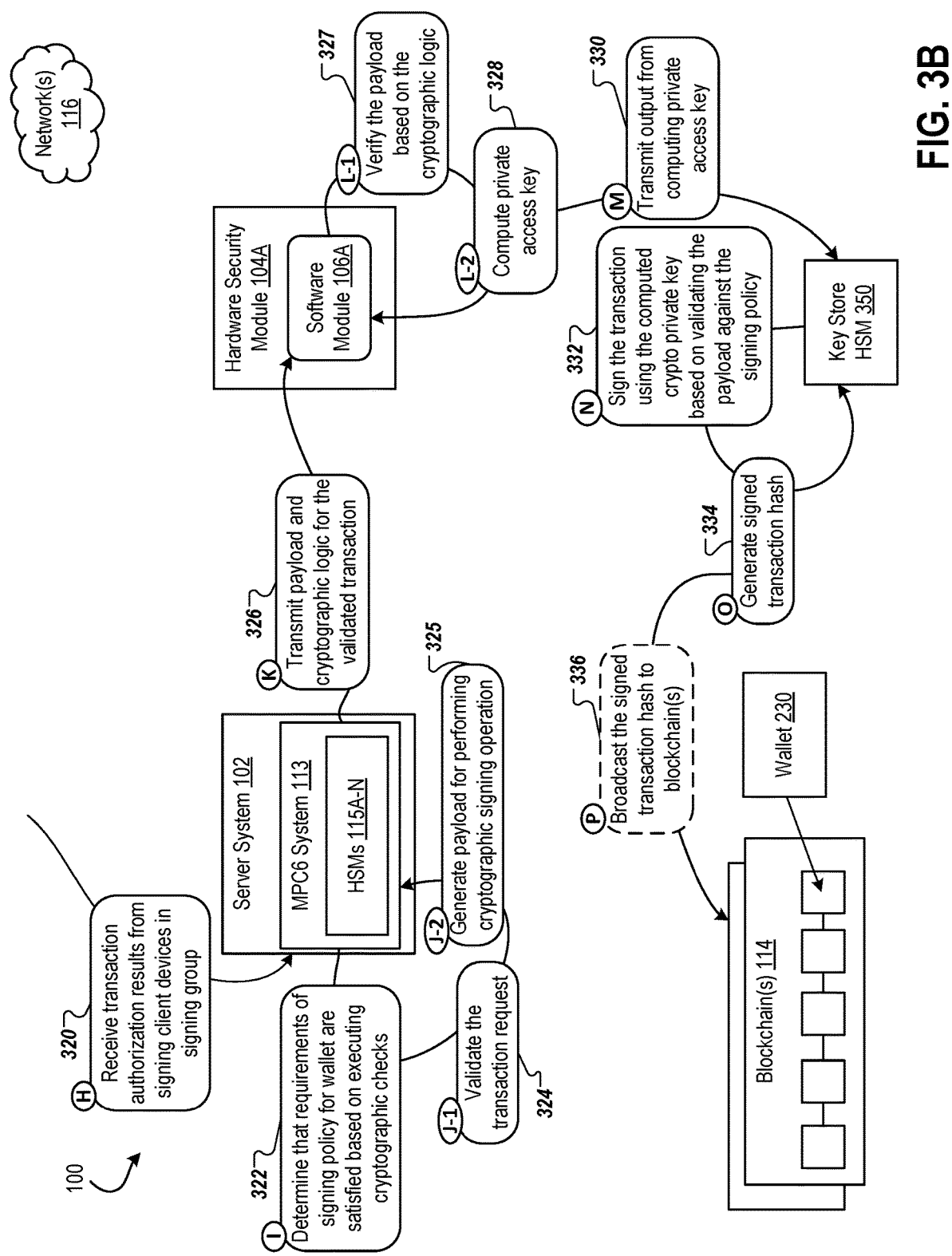
FIG. 3B is a conceptual diagram of a system for broadcasting approved transactions to one or more blockchains or other networks.

One or more of the signing client devices 112A-N can authorize the transaction request (block G, 132). Authorization results can be transmitted from the signing client devices 112A-N to the MPC6 system 113. The MPC6 system 113 may communicate the authorization results to the server system 102. Refer to FIG. 3B for further discussion.

If the server system 102 determines that the required number of signing client devices 112A-N (as defined by the signing policy or other parameters defined by the primary client device 108) authorize the transaction in G (132), the server system 102 can transmit a payload for the transaction to the one or more HSMs 115A-N to perform an MPC signing operation to then generate the authorization payload that will be presented/transmitted to the software module 106A-N of one or more of the HSMs 104A-N (block H, 134). As described further below, once the HSMs 104A-N receive the authorization payload from the HSMs 115A-N, the HSMs 104A-N can sign and broadcast the transaction to the blockchain(s) 114. Refer to FIGS. 3A-B, 5, and 6 for further discussion. In some implementations, a subset of the HSMs 104A-N can be randomly chosen to perform the signing. Transmitting the payload to the HSMs 104A-N can include encrypting the transaction to limit visibility into information associated with the transaction.

The software module 106A-N can then create a crypto private key for the primary client device 108 and sign the transaction based on information provided in the payload (block I, 136). For example, the software module 106A of the HSM 104A can receive the cryptographic logic that is generated as part of creating the signing policy and use the logic to validate the authorization results from the signing client devices 112A-N and sign the transaction. Using a series of secrets and cryptographic salt, as an illustrative example, relevant material can be momentarily combined at the HSM 104A to sign the transaction and return to a fragmented state. Refer to FIG. 3B for further discussion.

The signed transaction may optionally be broadcasted to the blockchain(s) 114 (block J, 138). The broadcasting can be performed by a third-party node that is designated/chosen by the primary client device 108. As an illustrative example, the server system 102 can provide the primary client device 108 with a selection of third-party nodes from which the primary client device 108 can choose for broadcasting the signed transaction. In some implementations, the primary client device 108 can download the signed transaction and then broadcast the transaction on their own to the blockchain(s) 114. The broadcasting can be performed directly or indirectly by the HSM 104A. Refer to FIG. 3B for further discussion.

As described throughout this disclosure, a cryptocurrency wallet operating on the HSMs 104A-N may not be a multi-signature wallet since only a single crypto private key is used by the HSMs 104A-N to sign transactions and that private key is not shared or otherwise distributed. The private key can be split up and secured by additional secrets that are associated with user accounts (e.g., the multiple signing client devices 112A-N). However, the concept of multiple signing client devices 112A-N confirming or authorizing before a proposed transaction can proceed, none of which may be controlled by the server system 102 itself, can be functionally similar with un-hosted multi-signature wallets, but with cryptographic security instead. Although the signing client devices 112A-N must validate each transaction request using their own credentials (e.g., username and password) and organizational x509 certificate, those signatures effectively can act as passcodes that are then used collectively to enable the crypto private key to be computed and then used to sign transactions. Accordingly, while the use of a sufficient number of signing client devices 112A-N credentials are a necessary condition to the HSMs 104A-N signing a transaction request, the signing client devices 112A-N are not themselves signing the transaction request using a wallet private key. Rather, the signing client devices 112A-N can provide their approval of the transaction request through cryptographic key technology that confirms they are indeed the signing client devices 112A-N with the authority to provide approval of the transaction request. As described herein, the signing client devices 112A-N can be virtual nodes in a cloud environment that are configured to perform the techniques and operations described throughout this document.

FIG. 2A is a conceptual diagram of the system 100 of FIG. 1 for generating private keys. The party at the primary client device 108 can generate user information in block A (200) using the software provided by the server system 102. Generating the user information can include creating a username and password for use with the software platform offered by the server system 102.

The user information can be transmitted to the server system 102 (block B, 202).

One or more of the software HSMs 111A-N of the server system 102 can generate a cryptographic key and organizational x509 certificate for the party of the primary client device 108 based on the user information in block C (204). The cryptographic key can include a public private key pair. The x509 certificate can be generated as part of a secure digital identity layer of the disclosed technology. The disclosed technology can also assign a user key pay and the x509 certificate to the party, which can be used to map the party's initiation events/requests to any shared access events. Refer to FIG. 9 for further discussion about performing a digital identify layer.

In block D (206), the one or more HSMs 111A-N can encrypt and store the user information. The encryption and storage can be done locally at the server system 102. For example, the party's username and password can be stored in encrypted form at the server system 102 in order to validate the party's access for certain account management functions with the software platform. Such encryption can prevent the server system 102 from viewing or accessing the party's password. The server system 102 may not store the cryptographic key and/or the organizational x509 certificate, in some implementations.

The party at the primary client device 108 can also initiate creation of a signing policy with a signing group and/or transaction authorization conditions (block E, 208). To initiate the creation of the signing policy, the party can provide user inputs to an automated web form developed and provided by the server system 102 in which the party can designate one or more parties in a signing group (e.g., signing parties) that will be asked for authorization/confirmation regarding transactions initiated by the primary client device 108. Such transactions can include, for example, transferring cryptocurrency from one or more cryptocurrency wallets created within the server system 102 and/or one or more wallets that are created in other networks outside of the server system 102. For the signing policy, the party can also designate a required number of authorizations that would be required to approve and execute such transactions that are requested by the primary client device 108. The signing policy can additionally or alternatively designate which parties must sign for a transaction. The signing policy can designate what combination of party or parties must sign for the transaction (e.g., 2 parties must authorize, either can authorize). The policy can include one or more rules indicating what is needed to authorize an activity, such as a transaction, using the disclosed systems and techniques.

In some implementations, the signing policy can specify a different required number of authorizations for transactions having different parameters. The parameters can include, but are not limited to, size (e.g., amount of currency being transacted), type of currency, parties involved, wallets involved, and other transaction conditions. For example, the party may designate a signing group of four parties: A, B, C, and D, and require that transactions in BITCOIN below 5 BTC require confirmation of two signing parties in the signing group to proceed, while transactions of 5 BTC or greater would require confirmations from all four signing parties in the signing group to proceed. The party at the primary client device 108 can also securely approve the created signing policy by signing a transaction using their cryptographic key and the organizational certificate (e.g., through providing their user information, such as username and password).

The party can initiate the creation of several signing policies, each to govern different transactions. For example, the party can initiate generating a signing policy to govern how a cryptocurrency transaction may be initiated from the software platform offered by the server system 102. The signing policy can cause creation of client-side cryptographic secret shares, which can be encoded data pieces that enable parties, such as the signing client devices 112A-N described herein or other virtual nodes in a cloud environment, to perform joint computations without revealing information about underlying inputs. As a result, the server system 102 may not have access to the crypto private keys, such as the cryptographic key that is generated for the party of the primary client device 108 and/or a wallet associated with the primary client device 108.

The primary client device 108 transmits instructions for creating the signing policy to the MPC6 system 113, and more specifically one or more of the HSMs 115A-N of the MPC6 system 113, in block F-2 (210).

In block F-2 (211), the one or more HSMs 115A-N can generate the signing policy, additional corresponding cryptographic logic, and shards that correlate to the signing policies used by the server system 102. The shards, as described in reference to FIG. 2B, can be assigned to one or more of the signing client devices 112A-N. The cryptographic logic can include rules that the server system 102 uses during runtime to validate a transaction request according to the transaction authorization conditions that the primary client device 108 established for the signing policy. The cryptographic logic can then be stored in a policy repository 420 (e.g., database, data store, cloud-based storage system, etc) for runtime use (block F-3, 213). Refer to FIGS. 3A-B for further discussion about the cryptographic logic.

FIG. 2B is a conceptual diagram of the system 100 of FIG. 1 for establishing signing group(s) to sign transactions according to user-defined signing policies. A layer of remote attestation can also be provided with the disclosed technology to continuously verify that the signing group (e.g., a signing environment) may not be a fraudulent trusted execution environment (TEE). Refer to FIG. 9 for further discussion about performing remote attestation as a hardware identification check. When using a TEE, its trustworthiness may be verified to ensure that there are no rogue actors in the signing group and to ensure that members of the signing group are who they claim they are. Therefore, when a user is onboarded to the signing group, their device can be paired with a unique identifier, which can be used to verify code running in a TEE matches what the user intends.

As described in reference to FIG. 2A, the party at the primary client device 108 can define signing policies that indicate how transaction requests are handled and validated. In a signing policy, the party can designate the signing client devices 112A-N, or virtual nodes in a cloud environment, as part of a signing group 230 and can also designate a required number of the signing client devices 112A-N in the signing group 230 that must authorize or confirm a transaction before the transaction can be validated/verified.

Once the signing policy is generated (refer to FIG. 2A), the MPC6 system 113 (or more specifically, one or more of the HSMs 115A-N) can generate a notification for accepting a signing responsibility (block G, 212). For example, the primary client device 108 can send a request to the server system 102 to create the signing group 230. The server system 102 can then sign the request using the user information for the party of the primary client device 108 (e.g., the public private key pay for the party). The signed request can optionally be broadcasted to each of the signing client devices 112A-N that are designated by the primary client device 108 in the request.

Information can be transmitted between the MPC6 system 113 and the designated signing client devices 112A-N in the signing group 230 (block H, 214). The information can include, for example, the notification that was generated in block G, 212.

If any of the signing client devices 112A-N haven't already, they can generate user information in block I (216). For example, if a party at a signing client device 112 does not have a username and password set up with the software platform provided by the server system 102, then block I, 216, can be performed at their signing client device 112. In some implementations, the signing client devices 112A-N can generate their user information before being added to a signing group or otherwise designated for the signing group by the primary client device 108. Once the party provides a username and password, a credential specific to the party and an x509 certificate can be generated for the party. If the party already has account information/credentials with the software platform of the server system 102, block I, 216, may not be performed.

The parties at the respective signing client devices 112A-N can accept their signing responsibilities in block J (218). In other words, each of the parties designated by the party at the primary client device 108 as being part of the signing group 230 must accept their appointment to the signing group 230. As an illustrative example, the parties at their signing client devices 112A-N can receive a prompt (e.g., notification, message) at their devices to onboard with the software platform as described above in reference to block I (216). As mentioned above, if a party already has generated their user information, block I (216) can be skipped and block J (218) can be performed after block H (214). The server system 102 can perform an integrity check and signing lockup on the request to accept the signing possibility to validate the identified of the requesting party against the user x509 certification for the requesting party. When all the requests pass (e.g., the signing client devices 112A-N accept the signing responsibility), MPC shard generation can be called or otherwise performed at the server system 102, as described below.

Once the party accepts the signing responsibility at the respective signing client device 112A-N, a notification indicating the acceptance can be transmitted back to the MPC6 system 113 (block H, 214).

If the parties accept the signing responsibility, then the server system 102 can assign the shards that were previously generated, as described in FIG. 2A, to the signing client devices 112A-N (block K, 220). The server system 102 can call an MPC shard generation process to be performed. Using the user x509 certificate that was generated for the party of the primary client device 108, the server system 102 can register each of the shards to a party at the signing client devices 112A-N. Each party at the signing client devices 112A-N can have a specific shard attributed to them. As an illustrative example, if a threshold requirement for a signing group is 3 out of a possible 4 parties/users, then there can be 4 shards attributed to each party at the signing client devices 112A-N. In some implementations, party of the primary client device 108 can be provisioned with a tree structure of x509 certificates relevant to the party's identity, permissions to different wallets, and/or to mediate access to shards stored in the MPC6 system 113 required for MPC operation. Every request made by the party at the primary client device 108 can require an x509 certificate and a cryptographically-signed representation of instructions going into the MPC6 system 113. Not only are the signed instructions required to validate authentication credentials of the party at the primary client device 108, the signed instructions may also be used to authorize the MPC6 system 113 to cryptographically unwrap the shards necessary for performing the MPC operation requested by the party.

The MPC6 system 113 can also transmit a notification to the primary client device 108 indicating that the signing group 230 is established (e.g., the signing client devices 112A-N accepted the signing responsibility) in block L (222).

The primary client device 108 can then generate and transmit instructions to create one or more wallets to the HSM 104A (block M, 224). When the party at the primary client device 108 needs to traverse from the MPC6 system 113 context into the HSM 104A context, the party may provide a series of credentials, as identified and described above. The series of credentials may only be provided, in some implementations, as a result of successfully performing MPC operations described above regarding the MPC6 system 113. As an illustrative example where a quorum of 3 out of 4 parties are required to sign, a gatekeeper function can be performed to mediate access to the HSM 104A, which may not require cumulative credentials of 3 users, but rather the cryptographic credentials of any 3 users out of 4, as computed by the MPC6 system 113 that can deliver one computed credential.

For example, using the credentials and organizational certificate, the primary client device 108 can direct the server system 102's automated software module 106A at the HSM 104A to create a public wallet address with an associated crypto private key (block N, 226). This credential and wallet creation request can undergo an automated systems check to ensure the request is created correctly without technical errors, and then communicated to one or more of the HSMs described herein. The HSM(s) can then create a public-private key pair, and the public wallet address can be displayed to the party at the primary client device 108. Thus, a wallet 230 for the party at the primary client device 108 can be created (block N, 226). In some implementations MPC authentication techniques can be layered with the wallet 230. The crypto private key may neither be displayed at the primary client device 108 nor be viewable or accessible to the server system 102.

FIG. 3A is a conceptual diagram of the system 100 of FIG. 1 for initiating transactions and obtaining approval or authorization by signing parties according to user-defined signing policies. Such transactions can include sending cryptocurrency from one wallet to another. Such transactions can also include sending other types of assets between different parties across networks, such as blockchains.

Using a web portal 301, the primary client device 108 can initiate a transaction request in block A (300). In some implementations, another party designated to raise transactions, but not designated as a signing party, can perform block A (300) to send cryptocurrency from their wallet to another wallet. Initiating the transaction request can include providing user input at the primary client device 108 designating an amount of cryptocurrency to be sent and a recipient's pubic wallet address.

The web portal 301 can be provided as part of the software platform of the server system 102. The web portal 301 can provide a web and/or mobile interface for the party at the primary client device 108 to manage their account, transactions, and/or wallets. The web portal 301 can also be provided to the signing client devices 112A-N or virtual nodes in a cloud computing environment to allow for the parties of these devices to perform actions with respect to their account, transactions, and/or wallets (such as authorizing the transaction request initiated by the primary client device 108).

The primary client device 108 can validate the transaction request based on the user information (e.g., their username and/or password) and organization certificate of the party associated with the primary client device 108 (block B, 302). Block B (302) can be performed using software that is provided by the server system 102 to the primary client device 108.

The primary client device 108 can transmit the encrypted transaction request upon validation to the server system 102 in block C (304).

In block D-1 (305), and assuming the server system 102 include a policy engine (described further in reference to FIG. 7), the server system 102 can retrieve cryptographic logic associated with the signing policy for the primary client device 108 from the policy repository 420. In some implementations, the server system 102 may already have the cryptographic logic locally accessible after the logic is generated by the server system 102, as described in reference to FIG. 2A.

Then, in block D-2 (306), the server system 102 can cryptographically verify that the transaction request parameters satisfy the cryptographic logic associated with the signing policy of the primary client device 108 (e.g., the party that initiated the transaction request in block A, 300). For example, the server system 102 can apply the logic or other rules to data or other information in the transaction request, which can designate a required number of transaction authorizations/confirmations of the signing client devices 112A-N in the signing group 230.

Once the server system 102 verifies that the parameters of the signing policy are met, the server system 102 can transmit an automated request for transaction authorization to the signing client devices 112A-N that are designated as part of the signing group 230 according to the signing policy (block E, 308). In some implementations, there can be a time-to-live in which the server system 102 waits for authorization from the signing client devices 112A-N. This time period can be predetermined. For example, the time period can be set by the server system 102. As another example, the time period can be set by the primary client device 108 in the associated signing policy. The time period can be an arbitrary time window, including but not limited to 1 minute, 3 minutes, 5 minutes, 10 minutes, 15 minutes, 30 minutes, 1 hour, etc. The time period can be adjustable by the primary client device 108, in some implementations. If the required number of signing client devices 112A-N does not authorize the transaction, then the transaction may be dropped and registered as a transaction signing failed event. Such information can be transmitted/relayed back to the primary client device 108, in some implementations.

In some implementations, one or more operations performed at the server system 102 can be performed by the software HSMs 111A-N. For example, the software HSMs 111A-N can perform blocks C (304), D1 (305), D2 (306), and/or E (308).

One or more of the signing client devices 112A-N can authorize the transaction in block F (310) and transmit authorization results back to the server system 102 (block G, 312). For example, each of the signing client devices 112A-N can receive an authorization/confirmation request notifying the relevant party of the transaction request initiated by the primary client device 108. The request can also present the party with the ability to authorize the transaction request using their respective credentials/user information (e.g., username and/or password) and organizational x509 certificate.

In some implementations, one or more of the signing client devices 112A-N may not authorize the transaction. If a required number of signing client devices 112A-N do not authorize the transaction, then the transaction may not be validated and thus the transaction may not be completed. If, on the other hand, the required number of signing client devices 112A-N authorize the transaction, then the transaction can be validated and completed, as described further at least in reference to FIG. 3B.

FIG. 3B is a conceptual diagram of the system 100 of FIG. 1 for broadcasting approved transactions to one or more blockchains or other networks.

The server system 102 can receive transaction authorization results from signing client devices in a signing group in block H (320). Refer to blocks E-F (308-312) in FIG. 3A for further discussion.

The MPC6 system 113 can determine that requirements of the signing policy for the wallet 230 associated with the primary client device 108 are satisfied based on executing one or more cryptographic checks (block I, 322). The MPC6 system 113, and more particularly the one or more HSMs 115A-N of the MPC6 system 113, can assemble a cryptographic signing function with snippets or secret material of authorization that comes from the signing client devices or virtual nodes in a cloud computing environment as described herein. The MPC6 system 113 can also perform various levels of cryptographic checks, including but not limited to checking certificates, checking individual signing client device certificates to confirm those signing client devices are in fact are allowed to authorize such a transaction, checking that a server cryptography is correct, and checking that no random servers have accessed the network(s) 116 or any of the components described herein (e.g., the server system 102, the HSM 104A, the primary client device 108, the signing client devices 112A-N).

Accordingly, the MPC6 system 113 can validate the transaction request based on the determination in block I, 322 (block J-1, 324).

In block J-2 (325), the MPC6 system 113 can generate a payload for performing a cryptographic signing operation. Based on the cryptographic certificate, the certificates (e.g., signing authorizations), and output from the determination in block I (322) to assemble the cryptographic signing function, the MPC6 system 113 can generate the payload. The payload can be generated in a secure cryptographic extension thread protection layer of the MPC6 system 113. For example, the MPC6 system 113 can encrypt the transaction using secure cryptographic extensions (or other types of trusted computing environments) so that contents of the transaction are secure and not visible to the MPC6 system 113. Refer to FIG. 9 for further discussion about the thread protection as part of a per transaction check.

The MPC6 system 113 can transmit the payload and cryptographic logic for the validated transaction to the software module 106A of the HSM 104A (block K, 326). The payload can include transaction information and confirmation that the cryptographic checks performed by the MPC6 system 113 have passed. Although one HSM 104A is described here, multiple HSMs can be used to perform the disclosed techniques for the transaction.

For example, as described above, the MPC6 system 113 can provide a secure code enclaves layer that can permit the transaction to execute using a subset of HSMs that can be randomly selected to perform signing operations for the transaction. In an illustrative implementation of the disclosed technology, a plurality of HSMs can be distributed across various geographically dispersed data centers to minimize change of intercepting a transaction message. Code can be securely executed within software modules of the subset of HSMs along with re-checking and verifying that the code received is the code that is expected. Refer to FIG. 9 for further discussion about the secure code enclaves as part of a code execution check.

In block L-1 (327), the software module 106A at the HSM 104A can verify the payload based on the cryptographic logic. The software module 106A can check the payload against the certificates using the cryptographic logic in order to ensure that the transaction has in fact been authorized. In some implementations, the software module 106A can also verify the payload based on validating identities of the signing client devices 112A-N with the cryptographic logic to ensure that the signing client devices 112A-N have actually been identified in the associated signing policy to have the authorization responsibility.

Once the payload is verified, the software module 106A can compute the crypto private access key for the wallet associated with the transaction (e.g., the wallet associated with the primary client device 108) using the secret material related to the wallet that is maintained/stored at the HSM 104A. In other words, the software module 106A creates an actual signed cryptocurrency transaction has based on the information contained in the payload and other information that may be resident at the HSM 104A from the cryptocurrency wallet creation (e.g., the secret materials described herein). A security feature of a wallet is that the associated crypto private key is not stored at rest in the HSM 104A, as described in reference to FIGS. 1-2. Instead, the crypto private key may only be derived within the HSM 104A if certain conditions are met, such as the transaction having been cryptographically confirmed by the server system 102 as described above. Upon receipt of the transaction information payload and confirmation by the HSM 104A that all required cryptographic checks have been provided, the software module 106A of the HSM 104A computes the crypto private key.

Accordingly, in another authentication and security layer, the HSM 104A holding the crypto private key attributed to a particular digital asset can use a series of secrets and cryptographic salt to generate material associated with the party that initiated the transaction request. Shares of the key can be unwrapped based on who is trying to do the signing. Relevant material can be momentarily combined within the HSM 104A to sign the transaction and then return to its fragmented state. A receiving institution or party can then, for example, receive the signed transaction packet for broadcasting to a blockchain or other secure network. Refer to FIG. 9 for further discussion about authenticating the HSM 104A as part of an infrastructure check.

The software module 106A can transmit output from computing the private access key to a key store HSM 350 (block B, 330). The key store HSM 350 can be separate from the HSM 104A but can be in network communication (e.g., wired, wireless). In some implementations, the key store HSM 350 can be part of the server system 102, part of the MPC6 system 113, and/or one of the HSMs 115A-N that resides within the MPC6 system 113.

The key store HSM 350 can be configured to sign the transaction using the computed crypto private access key (block N 332). The signing can be performed based on validating the payload against the signing policy (e.g., using the cryptographic logic provided by the server system 102).

The key store HSM 350 can also generate a signed transaction hash in block O (334).

Then, the signed transaction hash can optionally be broadcasted to the blockchain(s) 114 (or other networks) (block P, 336). The wallet 230, having a unique address, can be broadcasted to the blockchain(s) 114, to which tokens, cryptocurrencies, or other assets may be assigned. Once signed, the signed transaction hash, still resident within the HSM 104A, will be ready to be broadcast to the blockchain(s) 114. The server system 102 described herein can allow the primary client device 108 to determine how to broadcast the transaction to the blockchain(s) 114 network. In some implementations, as described above, the server system 102 can provide the primary client device 108 with options to communicate the transaction to a blockchain miner or other third-party node that may be unaffiliated with the server system 102. As a result, (i) fees that may be charged by the blockchain miner to broadcast the transaction can be paid by the primary client device 108 directly, rather than the server system 102, (ii) the server system 102 may not receive any portion of these fees or other compensation from the blockchain miner, and/or (iii) the primary client device 108 may not be required to use any such miner and may broadcast the transaction independently from its relationship with the server system 102. In any case, the server system 102 may not be directly involved in broadcasting the transaction to the blockchain(s) 114.

Accordingly, once the transaction is signed, it is the primary client device 108, not the server system 102, the HSM 104A, or the key store HSM 350, that is responsible for causing the transaction to be broadcast to the blockchain(s) 114 network. Moreover, the server system 102 does not have total independent control of value held in a wallet. Cryptocurrency can be held in the cryptocurrency wallet, the private key for which may not be held by the server system 102 and instead may only be generated within the HSM 104A. Although the wallet itself does not use multiple private keys to sign transactions within the HSM 104A, security features provided by the server system 102 can be functionally equivalent to a multi-signature wallet from a control sense, in that in order for a wallet owner to effect a transaction (e.g., the primary client device 108), multiple validated authorizations (e.g., by the signing client devices 112A-N or virtual nodes of a cloud environment) may be required as an input for the creation of the transaction message that is transmitted to the blockchain(s) 114. As in a multi-signature wallet, no single party, including the server system 102, has the ability to transact in the cryptocurrency held by a wallet. The cryptocurrency remains owned by the party of the primary client device 108 and can be held in that party's wallet rather than being reflected in accounts of the server system 102. Only the party of the primary client device 108 can trigger interaction with the wallet by initiating a transaction through the web portal and confirming the transaction through the signing client devices 112A-N, as described in reference to FIGS. 1-3. Once the server system 102 validates the cryptographic checks and the HSM 104A signs the transaction, the party of the primary client device 108, not the server system 102, can control how the signed transaction is communicated to the blockchain(s) 114, or a payment system. Therefore, the server system 102 may not have independent control of the value, because the private key for the wallet may only be generated within the HSM 104A, which is not controlled by the server system 102.

FIG. 4 is a system diagram of components that can perform the disclosed techniques. As described herein, the server system 102, HSMs 104A-N, primary client device 108, signing client devices 112A-N (or virtual nodes in a cloud computing environment), blockchain(s) 114, policy repository 420, and key store HSM 350 can communicate via the network(s) 116. As described herein, a party at the primary client device 108 can transact with another party over the blockchain(s) 114 using the disclosed technology. The disclosed system components can be provided as software as a service.

The server system 102 can include various software components, including but not limited to the software HSMs 111A-N described herein, the MPC6 system 113 having the HSMs 115A-N (e.g., hardware components), a user interface engine 400, user interface APIs 408, and core(s) 418. Sometimes, the server system 102 can optionally include a policy engine 110 (described further in reference to FIG. 7). In some implementations, the policy engine 110 can be one of the user interface APIs 408. The server system 102 can also generate and provide the software modules 106A-N to the HSMs 104A-N. The server system 102 can also provide an asynchronous MPC messaging network. Since the server system 102 can be separate from the HSMs 104A-N, the server system 102 components (e.g., software) can be deployed across a number of different industries and use cases, including but not limited to defense, healthcare, traditional banking, and/or building access controls.

The user interface engine 400 can include a web interface 402, mobile application 404, and/or internal middle office 406. The user interface engine 400 can be configured to implement logic for parties at the primary client device 108, the signing client devices 112A-N, or other client devices to manage their accounts and generate and perform transactions. The user interface engine 400 components can be provided as software as a service and/or with private cloud management.

The user interface APIs 408 can include a transaction and audit API 410, transaction builder 412, event queuing and management API 414, and/or a coordinator 416. The APIs 408 can be configured to implement and/or provide logic for techniques such as transaction assembly, signing policy evaluation, and transaction signing. The user interface APIs 408 can be provided as software as a service. Sometimes, the APIs 408 can be provided as software enclaves that can be partly hosted within a client device/computing system estate. The APIs 408 can be used as a threshold authentication and/or authorization platform irrespective of a domain application. The APIs 408 can additionally and/or alternatively be used to provide one or more of the following functions to parties at the primary client device 108 and the signing client devices 112A-N: creating user accounts, creating signing groups, setting threshold numbers of signing client devices, adding signing client devices to signing groups, removing signing client devices from the signing groups, setting message payloads, returning message payloads, setting and returning event model loops, and other functions.

The HSMs 104A-N software module 104 can be offered as software as a service across various different computing devices, systems, and/or networks in multiple different geographies. The HSMs 104A-N, via the software modules 106A-N, can be configured to store wallet information, in some implementations. In some implementations, one or more of the HSMs 104A-N may be partly hosted within the client device/computing system estate.

Figure 5:
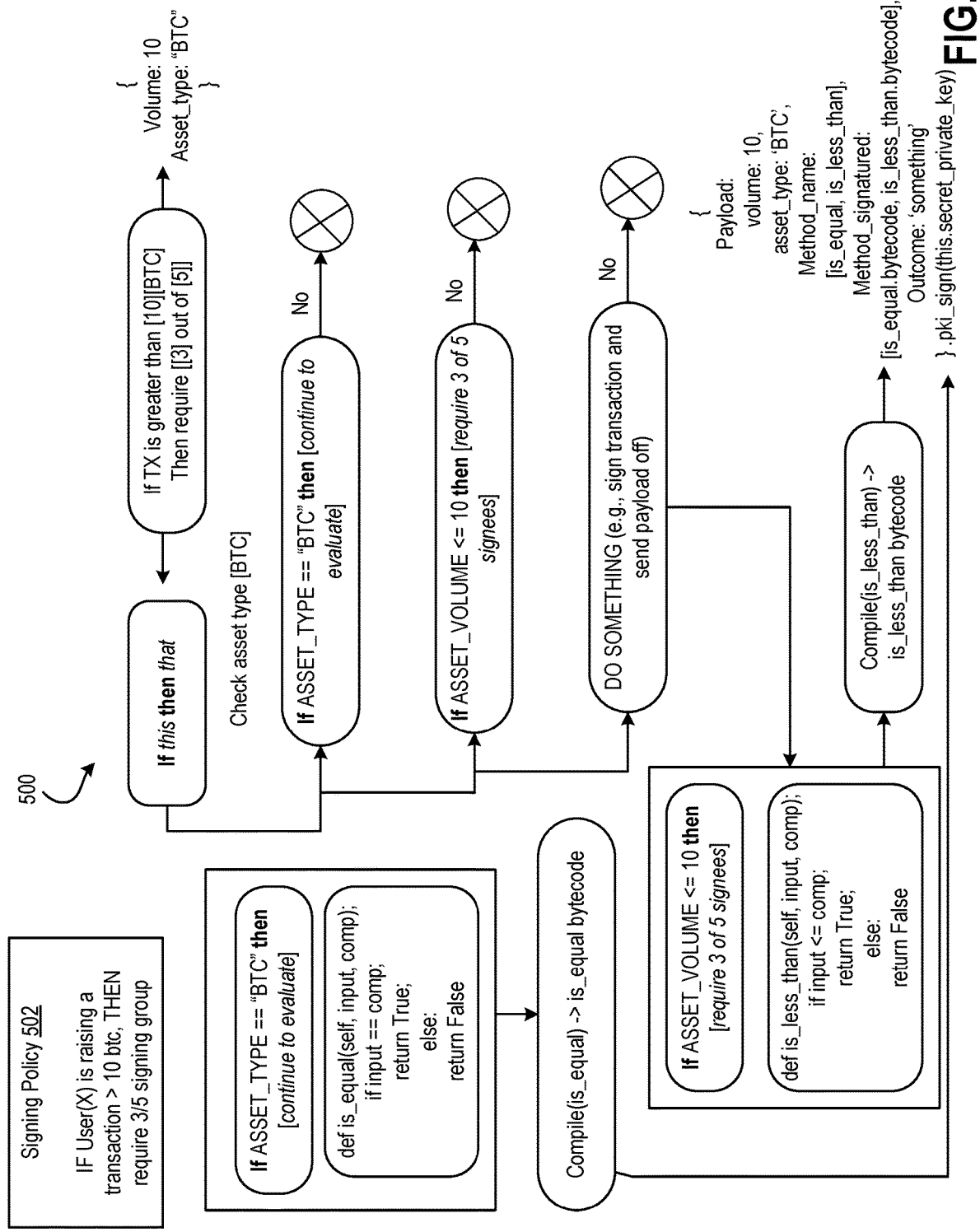
FIG. 5 is an illustrative example of a process to determine whether user-defined parameters in a signing policy are satisfied to authorize a transaction.

FIG. 5 is an illustrative example of a process 500 to determine whether user-defined parameters in a signing policy are satisfied to authorize a transaction. In some implementations, the process 500 can be performed by the server system 102 or components thereof, including but not limited to one or more software modules, applications, programs, computing systems, computing devices, and/or network of computing devices/systems. In some illustrative embodiments, one or more operations in the process 500 can be performed by a policy engine 110 (described further in reference to FIG. 7). For illustrative purposes, the example process 500 is described from the perspective of a server system.

Referring to the process 500, the server system can receive a signing policy 502, which can be defined or otherwise generated by the primary client device 108 (refer to at least FIG. 1). The signing policy 502 can indicate that if user X is raising a transaction request that has a quantity of more than 10 BTC, then 3 of 5 signing client devices (or 3 of 5 virtual nodes in a cloud computing environment) in a designated signing group must authorize the transaction. Otherwise, the transaction is denied. The signing policy 502 can indicate validation logic, validation input(s), validation output(s) and execution path taken, which can be signed individually and/or as a group of hashes. As a result, the signing policy 502 allows for implementation of the server system, implementation of the signing policy 502 itself, and outputs of implementing the signing policy 502 at the policy engine 110 tamper-resilient. The signing policy 502 is merely illustrative and can be defined with one or more other parameters, conditions, and/or criteria, according to the party associated with the primary client device 108.

As shown in the process 500 in FIG. 5, an asset type can first be checked for the transaction request. If the asset type is BITCOIN (BTC), then the policy engine 110 can continue through the process 500. If the asset type is not BITCOIN, then the process 500 stops.

If the asset volume is less than or equal to 10 BTC, then the server system can perform some action. The action can include, for example, signing the transaction and sending off a payload for the transaction so that the transaction can be completed/broadcasted to a network, such as a blockchain.

If the asset volume is greater than 10 BTC, then the server system can require authorization from 3 of the 5 signing client devices that are designated for the signing group. The server system can transmit an authorization request to the 5 signing client devices in the signing group and wait for authorization results from one or more of the signing client devices. Once the server system receives the authorization results and confirms that 3 of the 5 signing client devices designated for the signing group authorized the transaction, the server system can proceed to have the transaction signed and a payload sent for the transaction, as described in reference to FIGS. 1-3.

Figure 6:
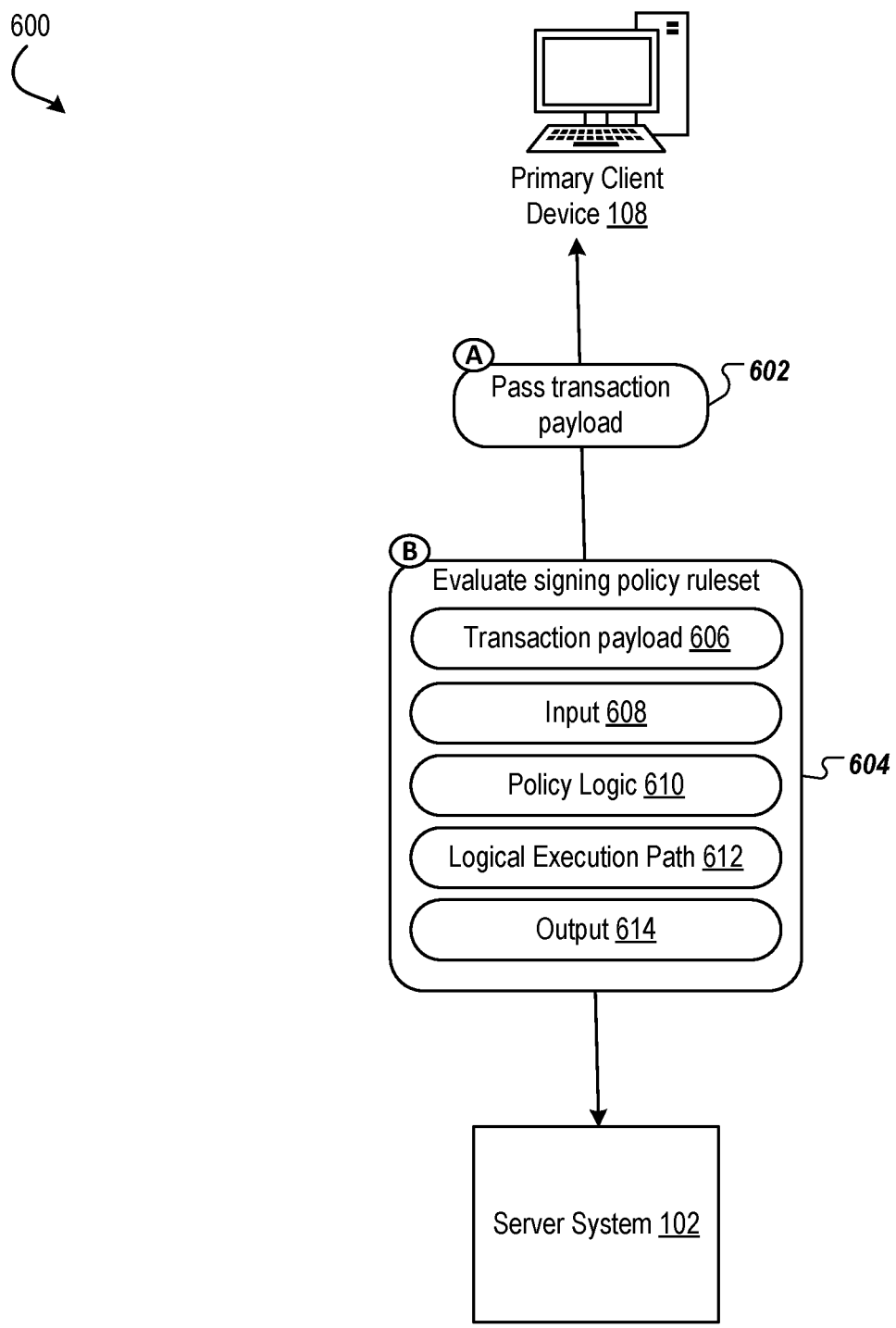
FIG. 6 is another illustrative example of a process to determine whether user-defined parameters in a signing policy are satisfied to authorize a transaction.

FIG. 6 is another illustrative example of a process 600 to determine whether user-defined parameters in a signing policy are satisfied to authorize a transaction. In some implementations, the process 600 can be performed by the server system 102 or components thereof, including but not limited to one or more software modules, applications, programs, computing systems, computing devices, and/or network of computing devices/systems. In some illustrative embodiments, one or more operations in the process 600 can be performed by a policy engine 110 (described further in reference to FIG. 7). For illustrative purposes, the example process 600 is described from the perspective of a server system. Moreover, the process 600 can include one or more of the blocks described in reference to FIGS. 1-3.

Referring to the process 600 in FIG. 6, a transaction request payload can be passed from the primary client device 108 to the server system in block A (602).

The server system can evaluate a signing policy ruleset in block B (604) before passing the transaction payload to other system components described herein. In other words, in block B (604), the server system can verify and/or validate the transaction request so that the transaction can be executed/broadcasted to networks, such as a blockchain. As part of evaluating the signing policy ruleset in block B (604), the server system can assess a transaction payload 606, provide the transaction payload 606 as input 608 to a signing policy logic 610, determine a logical execution path 612 based on the signing policy logic 610, and then generate output 614. The output 614 can indicate whether the signing policy ruleset has been validated/satisfied and thus whether the transaction can be passed to other system components and then executed/broadcasted as described throughout this disclosure. In some implementations, if the server system determines the signing policy ruleset is satisfied, the server system can also sign the transaction payload in blocks 612 and/or 614. In some implementations, as described herein, the server system can transmit a notification to the HSMs 104A-N described herein to then sign the transaction payload and continue to execute/broadcast the transaction.

Figure 7:
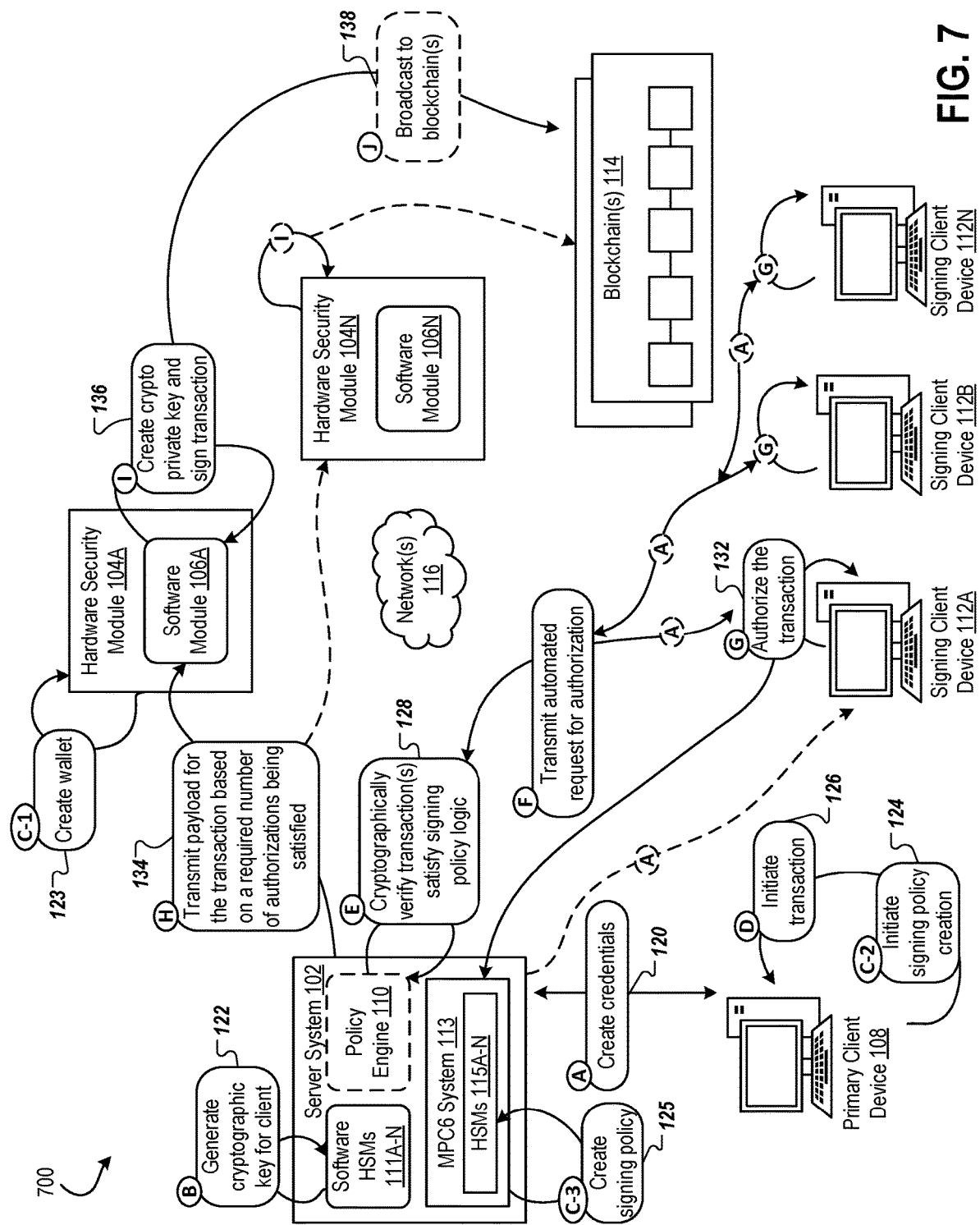
FIG. 7 is a conceptual diagram of an alternative embodiment of a system for providing non-custodial crypto asset management using MPC techniques.

FIG. 7 is a conceptual diagram of an alternative embodiment of a system 700 for providing non-custodial crypto asset management using MPC techniques. The system 700 includes the same or similar components as those described in the system 100 of FIG. 1. Moreover, the server system 102 in the system 700 of FIG. 7 can optionally include a policy engine 110. The policy engine 110 can be a software module deployed in one or more other computing environments, including but not limited to an enclave or one or more of the components described herein. The policy engine 110 can be configured to perform one or more of the disclosed techniques, such as ensuring that transactions requested by the primary client device 108 satisfy signing policies and parameters that are defined by the primary client device 108. The policy engine 110 can designate and administer differing conditions and levels of confirmation from one or more of the signing client devices 112A-N (or virtual nodes in a cloud computing environment) for various transactions associated with a wallet or other transaction or data. The policy engine 110 can more generally be any type of rule-based authorization system that can establish rules for authorization different types of transactions and/or data using the disclosed techniques. The policy engine 110 can communicate and interact with other components in the system 700, such as a software module 106A-N at each of the HSMs 104A-N, the blockchain(s) 114, other components of the server system 102, and other client devices to authorize transactions on public wallets.

The policy engine 110 can be used to set logic and conditions before a transaction can be processed. As part of every transaction, once a payload is created, it can be evaluated against an existing policy ruleset associated with a specific digital asset. These policy ruleset can reside in a secure private cloud environment. Only once one or more checks are authenticated and validated using the disclosed techniques can a payload be signed by the policy engine 110.

In the blocks A-J (120-138) described in reference to FIG. 1, in the system 700 of FIG. 7, the policy engine can perform block E (128), in which the engine 110 cryptographically verifies that the transaction(s) satisfy the signing policy logic. Refer to FIG. 1 for further discussion about operations performed in the block E (128).

Figure 8:
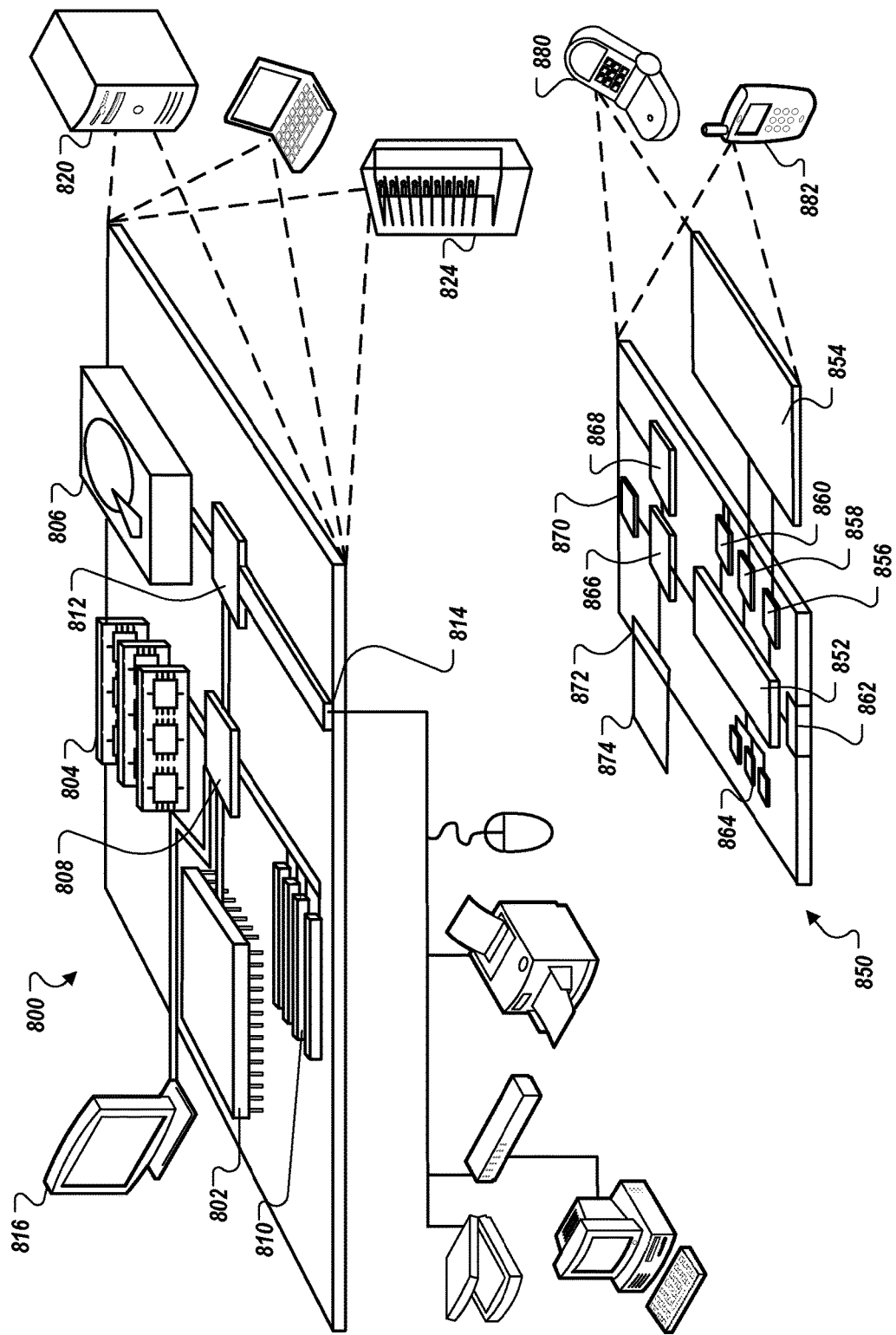
FIG. 8 is a schematic diagram that shows an example of a computing device and a mobile computing device.

FIG. 8 shows an example of a computing device 800 and an example of a mobile computing device that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the computing device 800. In some implementations, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device (not shown), such as a mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication in some implementations, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 874 can also be provided and connected to the mobile computing device 850 through an expansion interface 872, which can include, for example, a SIMM (Single In Line Memory Module) card interface. The expansion memory 874 can provide extra storage space for the mobile computing device 850, or can also store applications or other information for the mobile computing device 850. Specifically, the expansion memory 874 can include instructions to carry out or supplement the processes described above, and can include secure information also. Thus, for example, the expansion memory 874 can be provide as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 870 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880. It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

FIG. 9 is a flowchart of a process 900 for performing a multi-layer authentication process to execute a transaction request. The process 900 can be performed by the server system 102 and/or one or more components of the server system 102, such as the MPC6 system 113. In some implementations, the process 900 can be performed by other secure computing systems, computing environments, and/or enclaves. For illustrative purposes, the process 900 is described from the perspective of a server system.

Referring to the process 900 in FIG. 9, the server system can receive a transaction execution request in block 902. Refer to at least block D (126) in FIG. 1 for further discussion about receiving the transaction execution request.

The server system can perform a multi-layer authentication process in block 904 in response to receiving the transaction execution request. Although multiple authentication checks are described in the process 900, any combination of these authentication checks can be practice during runtime. One or more additional, other, or fewer authentication checks may also be performed with the disclosed techniques.

For example, the server system can perform a digital identity check in block 906. During this check, the server system can ensure that whatever user, server, system, or client device submits the transaction execution request is who they say they are. For example, even if a user provides a known share of a cryptographic key for execution of the transaction, the server system may want to check that not only is the known share correct but also an identifier of the user providing the share is correct or excepted (e.g., the user identifier is associated with the known share).

The server system can determine whether this check has passed (block 908). If the check does not pass, then the server system can deny the transaction request in block 932. If the check does pass, the server system can proceed to the next check.

In the next check, the server system can perform a policy signing check (block 910). During this check, the server system can retrieve the policy logic for the particular transaction execution request and verify that logic.

The server system can determine whether this check has passed (block 912). If the check does not pass, then the server system can deny the transaction request in block 932. If the check does pass, the server system can proceed to the next check.

In the next check, the server system can perform a hardware identification check (block 914). During this check, the server system can perform remote attestation to check whether the environment where the transaction would be executed is trusted and secure and/or whether code or other operations running in a signing environment is what it is supposed to be (e.g., is trusted and secured).

The server system can determine whether this check has passed (block 916). If the check does not pass, then the server system can deny the transaction request in block 932. If the check does pass, the server system can proceed to the next check.

The server system can perform a per transaction check (block 918). During this check, the server system can encrypt the processing for the transaction execution so that even the server system (or other executing, secure environment) cannot access the transaction.

The server system can determine whether this check has passed (block 920). If the check does not pass, then the server system can deny the transaction request in block 932. If the check does pass, the server system can proceed to the next check.

The server system can perform a code execution check in block 922. During this check, the server system can secure the code, such as by creating a secure enclave for executing the code for the transaction. The server system can also spin up and execute the code in a secure execution environment.

The server system can determine whether this check has passed (block 924). If the check does not pass, then the server system can deny the transaction request in block 932. If the check does pass, the server system can proceed to the next check.

The server system can then perform an infrastructure check (block 926). During this check, the server system can validate an HSM where the code would be executed to ensure that the HSM is in fact secure. The server system can validate operations to be executed at the HSM.

The server system can determine whether this check has passed (block 928). If the check does not pass, then the server system can deny the transaction request in block 932. If the check does pass, the server system can proceed to block 930, in which the server system performs a process to execute the transaction. Refer to at least FIG. 1 (e.g., blocks E-J, 128-138) for performing the process to execute the transaction.

The process 900 can be performed as described herein to iteratively validate the transaction execution request before it can be securely performed. If only one of the checks does not pass, then the server system can deny performing the transaction.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for managing, authenticating, and authorizing transactions utilizing multi-party-computation ("MPC") across a network, the method comprising:
  receiving, by a server and from a primary client device, policy data that defines a transaction signing policy, wherein the policy data comprises (i) a designation of a transaction signing group, (ii) a designation of a plurality of virtual nodes in a cloud environment that are included in the transaction signing group, and (iii) for each transaction class of a plurality of transaction classes, a corresponding threshold number of the plurality of virtual nodes that is required to authorize a transaction request, wherein the transaction request is a member of the transaction class;
  receiving, by the server and from an initiator node, the transaction request, wherein the transaction request includes a transaction parameter that indicates a transaction class of the transaction that is a member of the plurality of transaction classes;
  in response to receiving the transaction request:
    (i) determining, by the server and based on the transaction parameter and the transaction signing policy, a threshold number of virtual nodes amongst the plurality of virtual nodes that are included in the transaction signing group that are required to authorize the transaction request, and
    (ii) sending, by the server and to each of the plurality of virtual nodes that are included in the transaction signing group, an authorization request for each of the plurality of virtual nodes that are included in the transaction signing group to authorize the transaction request;
  receiving, by the server and from at least a subset of the plurality of virtual nodes that are included in the transaction signing group, authorization data indicating that the transaction request has been authorized by the respective virtual node; and
  based on a determination that the authorization data is collected from a number of the plurality of virtual nodes that are included in the transaction signing group that satisfies the threshold number of virtual nodes required to authorize the transaction request, returning, by the server and to a hardware security module (HSM), a transaction payload.

2. The method of claim 1, wherein the HSM is configured to execute software that is provided by the server, wherein executing the software causes the HSM to:
  compute a cryptographic private access key that is associated with digital data for the transaction request in response to the server determining that the authorization data is collected from the number of the plurality of virtual nodes that are included in the transaction signing group, wherein the determination made by the server indicates that secret material associated with the digital data can be used by the HSM to compute the cryptographic private access key.

3. The method of claim 2, wherein the cryptographic private access key is not stored by the HSM.

4. The method of claim 2, wherein executing the software further causes the HSM to digitally sign the transaction request.

5. The method of claim 4, wherein executing the software further causes the HSM to broadcast the signed transaction request across the network via one or more third-party nodes selected by the primary client device or the initiator node.

6. The method of claim 1, wherein the network is a blockchain.

7. The method of claim 1, wherein, before returning, by the server and to a hardware security module (HSM), a transaction payload, the method comprises performing, by the server, a multi-layer authentication check.

8. The method of claim 7, wherein the multi-layer authentication check comprises at least one, two, and three layers.

9. The method of claim 7, wherein the transaction payload is returned in response to determining, by the server, that each check of the multi-layer authentication check passes.

10. The method of claim 7, the method further comprising denying, by the server, execution of the transaction based on a determination that one check of the multi-layer authentication check does not pass.

11. The method of claim 7, wherein performing, by the server, the multi-layer authentication check comprises verifying, for each of the plurality of virtual nodes in the transaction signing group, (i) a share of a cryptographic key provided by the virtual node and (ii) an identifier associated with the virtual node, wherein (i) and (ii) are received in the authorization data.

12. The method of claim 7, wherein performing, by the server, the multi-layer authentication check comprises verifying the policy data.

13. The method of claim 7, wherein performing, by the server, the multi-layer authentication check comprises performing remote attestation to check whether an execution environment of the HSM is secure.

14. The method of claim 7, wherein performing, by the server, the multi-layer authentication check comprises encrypting the transaction payload, wherein encrypting the transaction payload prevents the server from accessing corresponding transaction data.

15. The method of claim 7, wherein performing, by the server, the multi-layer authentication check comprises creating a secure enclave for executing code for the transaction.

16. The method of claim 7, wherein performing, by the server, the multi-layer authentication check comprises validating the HSM and validating code execution operations for the transaction to be performed at the HSM.

17. The method of claim 1, wherein the server comprises an automated policy engine configured to perform operations of the method comprising:
  determining, based on the transaction parameter and the signing policy, the threshold number of virtual nodes amongst the plurality of virtual nodes that are included in the transaction signing group that are required to authorize the transaction request,
  determining the authorization data is collected from a number of the plurality of virtual nodes that are included in the transaction signing group that satisfies the threshold number of virtual nodes required to authorize the transaction request, and
  returning the transaction payload for the authorized transaction request.

18. A method for managing transactions across a network, the method comprising:
  receiving, by a server executing software to manage transactions over a network, policy data that defines a transaction signing policy, wherein the policy data comprises (i) a designation of a transaction signing group, (ii) a designation of a plurality of virtual nodes in a cloud environment that are included in the transaction signing group, and (iii) a threshold number of the plurality of virtual nodes that is required to authorize a transaction request;

receiving, by the server and from an initiator node, the transaction request;

determining, by a policy engine of the server and based on the transaction signing policy, a threshold number of virtual nodes amongst the plurality of virtual nodes that are included in the transaction signing group that are required to authorize the transaction request;

sending, by the server and to each of the plurality of virtual nodes that are included in the transaction signing group, an authorization request for each of the plurality of virtual nodes that are included in the transaction signing group to authorize the transaction request;

receiving, by the server and from at least a subset of the plurality of virtual nodes that are included in the transaction signing group, authorization data indicating that the transaction request has been authorized by the respective virtual node;

determining, by the policy engine of the server, whether the authorization data is collected from a number of the plurality of virtual nodes that are included in the transaction signing group that satisfies the threshold number of virtual nodes required to authorize the transaction request; and based on a determination that the authorization data is collected from the threshold number of virtual nodes required to authorize the transaction request, returning, by the server and to a hardware security module (HSM), a transaction payload.

19. The method of 18, wherein the HSM is configured to execute software that is provided by the server, wherein executing the software causes the HSM to:

compute a cryptographic private access key that is associated with digital data for the transaction request in response to the server determining that the authorization data is collected from the threshold number of the plurality of virtual nodes, wherein the determination made by the server indicates that secret material associated with the digital data can be used by the HSM to compute the cryptographic private access key.

20. The method of claim 19, wherein the digital data comprises a digital wallet.

* * * * *